US012773764B2

(12) United States Patent
Zhou

(10) Patent No.: US 12,773,764 B2
(45) Date of Patent: Oct. 27, 2026

(54) NAIL MAGAZINE DEVICE, DRIVING DEVICE, FIRING PIN LIFTING MECHANISM AND NAIL GUN

(71) Applicant: HANGZHOU GREAT STAR INDUSTRIAL CO., LTD., Hangzhou City (CN)

(72) Inventor: Lihua Zhou, Hangzhou City (CN)

(73) Assignee: HANGZHOU GREAT STAR INDUSTRIAL CO., LTD., Hangzhou City (CN)

( * ) Notice: Subject to any disclaimer, the term of this patent is extended or adjusted under 35 U.S.C. 154(b) by 0 days.

(21) Appl. No.: 19/223,939

(22) Filed: May 30, 2025

(65) Prior Publication Data

US 2025/0289105 A1 Sep. 18, 2025

Related U.S. Application Data

(63) Continuation-in-part of application No. PCT/CN2024/135500, filed on Nov. 29, 2024.

(30) Foreign Application Priority Data

Nov. 30, 2023 (CN) ......................... 202323264354.0

(51) Int. Cl.
*B25C 1/04* (2006.01)
*B25C 1/00* (2006.01)
*B25C 1/06* (2006.01)

(52) U.S. Cl.
CPC .................................... *B25C 1/005* (2013.01)

(58) Field of Classification Search
CPC ............ B25C 1/005; B25C 1/047; B25C 1/06
See application file for complete search history.

(56) References Cited

U.S. PATENT DOCUMENTS

| | | | | |
|---|---|---|---|---|
| 5,511,715 A * | 4/1996 | Crutcher | B25C 1/06 227/8 |
| 6,971,567 B1 * | 12/2005 | Cannaliato | B25C 1/06 173/205 |
| 8,763,874 B2 * | 7/2014 | McCardle | B25C 1/06 227/129 |
| 10,471,579 B2 * | 11/2019 | Zhang | B25C 1/047 |
| 10,632,600 B2 * | 4/2020 | Pomeroy | B25C 1/06 |

(Continued)

FOREIGN PATENT DOCUMENTS

| | | |
|---|---|---|
| CN | 101664916 A | 3/2010 |
| CN | 204382218 U | 6/2015 |

(Continued)

*Primary Examiner* — Gloria R Weeks
(74) *Attorney, Agent, or Firm* — Fitch, Even, Tabin & Flannery LLP

(57) ABSTRACT

A nail magazine device includes a side wall, a movable member and a cover. The cover is provided on the side wall, and the cover and the side wall define an internal space therebetween, in which the movable member positioned with its first side surface facing the side wall and its second side surface facing the cover. The internal space between the movable member and the cover provides a nail chamber for receiving gun nails. The cover is configured to be openable and closable with respect to the side wall to open or close the nail chamber. The movable member is configured to be able to adjust a width of the nail chamber.

7 Claims, 22 Drawing Sheets

(56) References Cited

U.S. PATENT DOCUMENTS

| | | | | |
|---|---|---|---|---|
| 10,821,586 | B2 * | 11/2020 | Wu | B25C 1/047 |
| 10,898,994 | B2 * | 1/2021 | Carrier | B25C 1/047 |
| 11,148,268 | B2 * | 10/2021 | Zhang | B25C 1/06 |
| 11,345,008 | B2 * | 5/2022 | Pomeroy | B25C 5/13 |
| 11,433,522 | B2 * | 9/2022 | Feng | B25C 1/047 |
| 2011/0114695 | A1 | 5/2011 | Yang et al. | |
| 2015/0209947 | A1 * | 7/2015 | Mandel | F16H 3/003 474/69 |
| 2020/0338708 | A1 | 10/2020 | Po | |
| 2021/0205969 | A1 | 7/2021 | Zhu | |
| 2021/0291335 | A1 * | 9/2021 | Liu | B25C 1/047 |
| 2021/0347023 | A1 * | 11/2021 | Carrier | B25C 1/008 |
| 2021/0354276 | A1 * | 11/2021 | Zhang | B25C 1/047 |
| 2022/0063074 | A1 * | 3/2022 | Wierzchon | B25C 1/048 |
| 2022/0134524 | A1 | 5/2022 | Shioya et al. | |
| 2022/0176530 | A1 * | 6/2022 | Xu | F16H 21/36 |
| 2022/0226977 | A1 * | 7/2022 | Nettleton | B25C 1/001 |
| 2022/0355455 | A1 * | 11/2022 | Kondo | B25C 1/06 |

FOREIGN PATENT DOCUMENTS

| | | | |
|---|---|---|---|
| CN | 110253503 | A | 9/2019 |
| CN | 113070849 | A | 7/2021 |
| CN | 113490574 | A | 10/2021 |
| CN | 217097627 | U | 8/2022 |
| CN | 220506471 | U | 2/2024 |
| CN | 220561458 | U | 3/2024 |
| CN | 220903216 | U | 5/2024 |
| CN | 221364683 | U | 7/2024 |
| EP | 3984703 | A1 | 4/2022 |
| JP | 3101023 | U | 6/2004 |
| TW | 200626311 | A | 8/2006 |

* cited by examiner

NAIL MAGAZINE DEVICE, DRIVING DEVICE, FIRING PIN LIFTING MECHANISM AND NAIL GUN

RELATED APPLICATIONS

This application is a continuation-in-part (CIP) application claiming benefit of PCT/CN2024/135500 filed on Nov. 29, 2024, which claims priority to Chinese Utility Model application No. 202323264354.0 filed on Nov. 30, 2023, the disclosures of which are incorporated herein in their entirety by reference.

FIELD OF THE INVENTION

The present application relates to the field of nailing tools, and particularly to a nail magazine device, a driving device, a firing pin lifting mechanism and a nail gun.

DESCRIPTION OF THE PRIOR ART

There are straight nails of various gauges, which can be used in nail guns, such as 10 to 50-mm long 18 Ga (1.05 mm×1.25 mm in cross-section) or brad nails and 25 to 64-mm long 16 Ga (1.4 mm×1.6 mm in cross-section) or finish nails. Due to absence of a common nail magazine device, two dedicated models (PT18G and PT16G) have been developed for firing nails of the respective gauges.

As the aforementioned two types of nails are of different sizes, if they are both used in a single nail magazine, nail jamming or double firing would be expected. Chinese Pat. App. Pub. No. CN101664916A discloses a triple-use magazine device for a nail gun, which allows compatible use of nails of both the aforementioned types and staples of a certain type. The two types of straight nails are loaded in two separate chambers. This structure is complex and suffers from frequent nail jamming caused by loading of incorrect brad nails in the chamber for finish nails.

On the market, there are two types of nail guns, pneumatic and electric, for driving nails into wooden boards, walls and the like.

A pneumatic nail gun is equipped with an air compressor, a huge air reservoir and an air hose connecting the gun to the reservoir. In operation, compressed air from the reservoir drives a piston and hence a striker thereon to reciprocate between nail-firing and rest positions. Since each nailing action consumes an amount of compressed air, once pressure in the air reservoir drops to a certain level due to such consumption of compressed air, the air compressor is activated to replenish the air reservoir. The pneumatic nail gun is inconvenient to transport due to the presence of the air compressor and reservoir. In addition, during use, the air hose may cause undesirable dragging and stumbling.

Electric nail guns use a gas spring as a power source for filing nails, in which a motor is powered by electricity (e.g., from a replaceable battery) to operate to actuate a firing pin lifting mechanism to lift a firing pin or (striker) to compress the gas spring. When raised to a predetermined position, the firing pin is released by the firing pin lifting mechanism and then moved by a biasing force of the gas spring to fire a nail. As the motor continues operating, the firing pin is repeatedly lifted to consecutively fire nails. During nail firing, compressed air in the gas spring is simply compressed and expanded, without being consumed at all.

In a conventional electric nail gun, a gas (e.g., an inert gas such as nitrogen) is permanently sealed in a gas spring. When the nail gun is out of use (e.g., for storage, transportation, etc.), the compressed gas in the gas spring still maintains a high pressure. This creates potential safety hazards and causes fatigue of the sealing structure, shortening the lifespan of the gas spring.

Filling the sealed chamber with a compressed gas when the electric nail gun is to be used and discharging the gas from the gas spring when the nail gun is out of use (e.g., for storage, transportation, etc.) can overcome the disadvantages arising from permanent sealing of air in the gas spring. This requires the electric nail gun to be equipped with a motor-driven air pump. Therefore, in order to implement such an electric nail gun, it would be desirable to appropriately design its structure so that it is compact and not bulky and can result in manufacturing cost savings. It is also desirable to appropriately design its center of mass to facilitate gripping during use. Other considerations may also be taken into account.

In such a nail gun, in order to lift the firing pin, accurate engagement of the firing pin lifting mechanism with the firing pin is necessary. For example, such precise engagement is necessary for first and second engaging portions disclosed in Chinese Pat. App. Pub. No. CN113490574A, for a partial gear and a rack (serving as a firing pin) disclosed in Chinese Pat. App. Pub. No. CN113070849A, and for a toothed cylinder and meshing teeth disclosed in Chinese Pat. App. Pub. No. CN113070849A. When the firing pin lifting mechanism and the firing pin engage with a deviation in position with respect to each other, for example, when the firing pin deviates from the supposed position after firing a nail, something undesirable, such as excessive wear and tear, jamming or damage to the firing pin lifting mechanism and/or the firing pin, tends to occur. Lubricating the firing pin lifting mechanism can provide for and ensure the firing pin lifting mechanism and the firing pin being maintained in accurate engagement, reduced wear and tear and an extended lifespan.

SUMMARY OF THE INVENTION

It is an object of the present application to overcome the problem that nail magazines of existing nail guns do not allow compatible use of straight nails of different gauges by presenting a novel nail magazine device and nail gun. The nail magazine device has a nail chamber which allows compatible use of straight nails of different gauges, resulting in product cost savings and loading of incorrect nails.

The above object is attained by a nail magazine device according to the present application, which comprises a side wall, a movable member and a cover. The cover is provided on the side wall, and the cover and the side wall define an internal space therebetween, in which the movable member is positioned with its first side surface facing the side wall and its second side surface facing the cover. The internal space between the movable member and the cover provides a nail chamber for receiving gun nails. The cover is configured to be openable and closable with respect to the side wall to open or close the nail chamber. The movable member is configured to be able to adjust a width of the nail chamber.

Additionally, the nail magazine device may further comprise first resilient elements, which are each coupled to the first side surface of the movable member at a first end thereof and to the side wall at a second end thereof.

Additionally, the side wall may have edge lips, on which the cover is slidably arranged.

Additionally, the nail magazine device may further comprise a trailing cap disposed over a rear portion of the cover and configured to, during frontward movement of the cover, be able to abut against a rear end of the side wall to block the cover from further frontward movement.

Additionally, the nail magazine device may further comprise an abutment member and second resilient elements, wherein the abutment member is provided in the nail chamber, and wherein front ends of the second resilient elements are coupled to the abutment member, and rear ends of the second resilient elements are coupled to the trailing cap.

Additionally, the cover may have receptacle bores extending frontward and rearward, wherein the second resilient elements are provided in the receptacle bores; the receptacle bores have slits in communication with the nail chamber; the abutment member has legs extending through the slits into the receptacle bores; and the front ends of the second resilient elements are coupled to the legs.

The above object is also attained by a nail magazine device according to the present application, which defines one nail chamber having an exit at its front end. A width of the nail chamber is defined by a movable member and an openable cover, which are arranged in opposition to each other, and can be adjusted as a result of movement of the movable member. First resilient elements can apply biasing forces to the movable member to urge it toward the cover.

The cover of the nail magazine device can be opened, and straight nails of any gauge can be loaded into the nail chamber. After the cover is closed, the first resilient elements bias the movable member to press the gun nails against the cover, making the width of the nail chamber just suitable for the gauge of the gun nails being stored, without nail jamming or double firing. Further, the cover can locate the gun nails in place, ensuring gun nails of any gauge can be output from the exit.

In order to allow the movable member to adjust its position according to the gauge of gun nails to be loaded into the nail chamber to adapt its width to that of the gun nails, the movable member may be arranged between the cover and a side wall, and the first resilient elements may be helical compression springs supported at their opposite ends respectively on the movable member and the side wall.

In order to restrict the movable member, the side wall may define upper and lower engagement grooves in alignment with each other. An upper edge of the movable member may be slidably received in the upper engagement groove, and a lower edge thereof may be slidably received in the lower engagement groove. The upper engagement groove may have a width greater than a thickness of the movable member at the upper edge, and the lower engagement groove may have a width greater than a thickness of the movable member at the lower edge. In this way, the movable member is allowed to move within a predetermined range.

Additionally, the cover may be assembled on the side wall so as to be slidable frontward and rearward. Specifically, the side wall may define upper and lower slide grooves in alignment with each other, and upper and lower edges of the cover may be slidably received in the upper and lower slide grooves, respectively.

Additionally, a first stop pin may be provided on the side wall to block the cover from sliding off the side wall and hence the nail magazine during use.

During nailing, in order to feed gun nails in the nail chamber frontward one by one, an abutment member may be provided in the nail chamber, which is assembled to the cover so as to be movable therewith. The abutment member may be biased frontward by second resilient elements to urge gun nails in the same direction.

In order to obtain a compact structure, in particular while avoid the second resilient elements from being interfered with, the cover may have receptacle bores extending frontward and rearward, and the second resilient elements may be helical compression springs disposed in the receptacle bores. The receptacle bores may have slits in communication with the nail chamber, and the abutment member may have legs, which extend through the slits into the receptacle bores, thereby enabling the biasing of the second resilient elements. With this arrangement, the abutment member can be moved rearward to compress, and thus be biased frontward by, the second resilient elements to feed gun nails in the nail chamber frontward. Further, the abutment member may be vertically located in place in the nail chamber by the legs in the slits.

In order to ensure smooth transfer of the biasing forces, push posts may be arranged in the receptacle bores to transmit the biasing forces from the second resilient elements to the legs.

In order to avoid the abutment member from separating from the cover, second stop pins may be provided on a front portion of the cover, and a trailing cap may be disposed over a rear portion of the cover. The second stop pins and the trailing cap can confine the second resilient elements and the legs of the abutment member between them.

In order to enable reliable feeding of gun nails, on a front end face of the abutment member, deformable elements may be provided which protrude from left and right sides thereof to enlarge a contour of the abutment member for contacting and abutting against gun nails. The deformable elements may be provided in grooves at opposite sides of the nail chamber. This can prevent the abutment member from getting stuck between gun nails and the movable member or the cover due to a relatively small thickness at the front end face.

In order to press all the gun nails in the nail chamber against the cover, the movable member may be provided in the shape of a plate. Moreover, in order to avoid a head portion of any gun nail from getting stuck, one or more first grooves extending frontward and rearward may be provided in a side surface of the movable member facing the nail chamber, and one or more second grooves extending frontward and rearward may be provided in a side surface of the cover facing the nail chamber. Each of the first grooves may be in one-to-one correspondence with a respective one of the second grooves. With this arrangement, a gun nail may be received in the nail chamber, with its head portion being positioned in a pair of corresponding grooves so as to be smoothly movable therein frontward and rearward.

In order to avoid a pointed tip of any gun nail from getting stuck, a support strip may be provided on the bottom of the nail chamber.

The above object is also attained by a nail gun according to the present application, which includes a gun body and the nail magazine device as described above. The gun body defines a striking chamber, and the nail magazine device is assembled with the gun body, with the exit of the nail chamber being fitted with the striking chamber. The nail magazine device serves to feed gun nails into the striking chamber to enable consecutive firing of them.

In order to avoid the cover from being inadvertently opened and to confine gun nails within the nail chamber, the cover may be locked by an unlockable locking structure in a position where it covers the nail chamber. With this arrangement, the cover may be opened after the locking structure is unlocked, allowing replenishment of gun nails in the nail chamber.

Therefore, the width of the nail chamber for storage of gun nails is defined by the movable member and the openable cover disposed in opposition thereto and can be adjusted as a result of movement of the movable member. To this end, the first resilient elements are provided, which bias the movable member toward the cover. With this arrangement, biased by the first resilient elements, the movable member functions to press gun nails in the nail chamber against the cover, making the width of the nail chamber just suitable for the gauge of the gun nails being stored, without nail jamming or double firing. Further, the cover can locate the gun nails in place, ensuring gun nails of any gauge can be output from the exit.

It is another object of the present application to provide a driving device for driving a firing pin to fire nails using a gas spring and an associated nail gun, which overcome the disadvantages arising from permanently sealing air in a gas spring as in conventional electric nail guns and provide at least one of the advantages as follows: a sensible structural design, which enables the electric nail gun to be compact in structure and not bulky in size; low manufacturing cost; and a center of mass, which is appropriately configured to facilitate gripping and use.

The above object is also attained by a driving device according to the present application, which is configured to be able to rotate in a first direction to drive a lifting wheel to lift a firing pin over a first period of time, and to rotate in a second direction to drive an air pump to fill air into a cylinder over a second period of time.

Additionally, the driving device may comprise:

a motor having a first output end and a second output end;

a first transmission means provided between the first output end of the motor and the lifting wheel, the first transmission means comprising a first one-way rotation mechanism, the first transmission means configured so that the first output end, when rotating in the first direction, drives the lifting wheel by means of the first transmission means and that, when the first output end rotates in the second direction, the first one-way rotation mechanism disengages the first output end from driving the lifting wheel; and a second transmission means provided between the second output end of the motor and the air pump, the second transmission means comprising a second one-way rotation mechanism, the second transmission means configured so that the second output end, when rotating in the second direction, drives the air pump by means of the second transmission means and that, when the second output end rotates in the first direction, the second one-way rotation mechanism disengages the second output end from driving the air pump.

Additionally, the first transmission means may further comprise a first speed-reducing mechanism, wherein the lifting wheel, the first speed-reducing mechanism and the first one-way rotation mechanism are coaxially disposed with the first output end; the first speed-reducing mechanism is a planetary gear mechanism with coaxial input and output ends; and the first one-way rotation mechanism is a ratchet-pawl mechanism.

Additionally, the first one-way rotation mechanism may comprise a first ratchet-pawl mechanism configured to: when the first output end rotates in the first direction, be able to come into engagement to drive the lifting wheel; and when the first output end rotates in the second direction, be able to rotate idly to disengage the first output end from driving the lifting wheel.

Additionally, the first one-way rotation mechanism may further comprise a second ratchet-pawl mechanism configured to: when the first output end rotates in the first direction to drive the lifting wheel by means of the first transmission means, be able to rotate idly; and when the lifting wheel rotates in the second direction, be able to come into engagement to block the lifting wheel from rotating in the second direction.

Additionally, the second transmission means may further comprise a second speed-reducing mechanism and a flywheel, the flywheel configured to be able to drive the air pump to fill air into the cylinder, a central axis of the flywheel located below a central axis of the second output end, wherein the second speed-reducing mechanism is an off-axis gear transmission mechanism, and the second one-way rotation mechanism is a ratchet-pawl mechanism.

Additionally, the second transmission means may comprise the off-axis gear transmission mechanism and a third ratchet-pawl mechanism, which successively transmit power from the second output end to the flywheel, the third ratchet-pawl mechanism configured so that the second output end, when rotating in the second direction, drives the flywheel by means of the second transmission means; and that, when the second output end rotates in the first direction, the third ratchet-pawl mechanism disengages the second output end from driving the flywheel.

The above object is also attained by a driving device for driving a firing pin to fire nails using a gas spring according to the present application, which comprises:

a motor having a first output end and a second output end;

a lifting wheel for lifting the firing pin and compressing the gas spring;

a first transmission means provided between the first output end of the motor and the lifting wheel, the first transmission means comprising a first one-way rotation mechanism, wherein the first output end, when rotating in one direction, drives the lifting wheel by means of the first transmission means, and when the first output end rotates in the other direction, the first one-way rotation mechanism disengages the first output end from driving the lifting wheel;

a flywheel for driving the air pump; and a second transmission means provided between the second output end of the motor and the flywheel, the second transmission means comprising a second one-way rotation mechanism, wherein the second output end, when rotating in one direction, drives the flywheel by means of the second transmission means, and when the second output end rotates in the other direction, the second one-way rotation mechanism disengages the second output end from driving the flywheel, wherein the first and second one-way rotation mechanisms are configured so that, when the first and second output ends of the motor simultaneously output torques, one of the lifting wheel and the flywheel is driven, and the other is disengaged from being driven.

In this driving device, power is provided to both the lifting wheel and the flywheel by the single motor. Compared with equipping the lifting wheel and the flywheel with separate motors, this allows reduced use of one motor, resulting in space savings. Thus, the driving device can be made not bulky in size, and the manufacturing cost of the product can be reduced. An associated nail gun can be filled with air only at the beginning of use, without needing to be re-filled with air at all during use. Therefore, providing power to both the lifting wheel and the flywheel allows the single motor to play its full role. In contrast, if the lifting wheel and the flywheel are equipped with separate motors, then the motor for driving the flywheel would be idle for a long time, leading to a waste of resources.

In this driving device, with the first and second one-way rotation mechanisms, when the first and second output ends of the motor simultaneously output torques, one of the lifting wheel and the flywheel is driven, and the other is disengaged from being driven. That is, when the lifting wheel is being driven, the flywheel is not driven; and when the flywheel is being driven, the lifting wheel is not driven. In this way, air filling and nailing are accomplished in different time periods, reducing workload on the motor.

In order to make the lifting wheel more powerful in lifting the firing pin, the first transmission means may include a first speed-reducing mechanism, which can amplify a torque from the first output end at the lifting wheel.

In order for a compact structure to be achieved, the lifting wheel, the first speed-reducing mechanism and the first one-way rotation mechanism may be disposed coaxially with the first output end. This allows these components to have a reduced radial footprint, helping in avoiding the product from having a bulky size. In particular, the first speed-reducing mechanism may be a planetary gear mechanism with coaxial input and output ends, and the first one-way rotation mechanism may be a ratchet-pawl mechanism.

The first one-way rotation mechanism may include a first ratchet-pawl mechanism configured to: when the first output end rotates in one direction, come into engagement to enable the first output end to drive the lifting wheel; and when the first output end rotates in the other direction, rotate idly to disengage the first output end from driving the lifting wheel.

In order for the nail gun to operate more efficiently, the firing pin is usually kept at a high position. This can be accomplished by monitoring the position of the firing pin using a position detector and stopping the motor once the firing pin reaches the predetermined high position. With this arrangement, as soon as the nailing function is activated after the gas spring is formed by filling air into the sealed chamber, the firing pin is allowed to immediately fire nails, without needing to be lifted first. To this end, the first one-way rotation mechanism may include a second ratchet-pawl mechanism. The first ratchet-pawl mechanism may be disposed proximal to the first output end, and the second ratchet-pawl mechanism may be disposed proximal to the lifting wheel. The second ratchet-pawl mechanism may be configured to rotate idly when the first output end is driving the lifting wheel by means of the first transmission means. It may also be configured to, when the lifting wheel tends to rotate in the opposite direction, come into engagement to block the lifting wheel from rotating in the opposite direction. In this way, through bringing the second ratchet-pawl mechanism into engagement, the firing pin can be always retained at the high position after the motor stops operation, without falling under the action of the gas spring.

In one embodiment, the first transmission means includes a first planetary gear mechanism, a second planetary gear mechanism, a first ratchet-pawl mechanism and a third planetary gear mechanism, which successively transmit power from the first output end to the lifting wheel. The first ratchet-pawl mechanism is provided at an output end of the second planetary gear mechanism, and the second ratchet-pawl mechanism is provided at an output end of the third planetary gear mechanism. With this arrangement, when the second output end of the motor drives rotation of the flywheel by means of the second transmission means, the first ratchet-pawl mechanism rotates idly without causing the first output end to drive the lifting wheel. That is, the third planetary gear mechanism and the second ratchet-pawl mechanism are not involved in this process. When the motor is stopped, the second ratchet-pawl mechanism blocks rotation of the lifting wheel corresponding to falling of the firing pin from being transferred to the second planetary gear mechanism, avoiding the first and second planetary gear mechanisms from being affected. In this way, the planetary gear and ratchet-pawl mechanisms in the first transmission means remain in rest without transmitting any force, helping in reducing their fatigue.

Specifically, the first planetary gear mechanism includes a first input gear, first planet gears, a first output member and a first ring gear. The first ring gear is fixed, and the first planet gears are provided on the first output member so as to be in engagement with the first input gear and the first ring gear. The first input gear is engaged with the first output end in a manner capable of transmitting power.

The second planetary gear mechanism includes a second input gear, second planet gears, a second output member and a second ring gear. The second ring gear is fixed, and the second planet gears are provided on the second output member so as to be in engagement with the second input gear and the second ring gear. The second input gear is provided on the first output member.

The first ratchet-pawl mechanism includes a first ratchet sleeve and first pawls. The first ratchet sleeve is rotatable and provided with first one-way teeth on its inner wall surface. The first pawls are provided on the second output member and biased by first springs against the inner wall surface of the first ratchet sleeve.

The third planetary gear mechanism includes a third input gear, third planet gears, a third output member and a third ring gear. The third ring gear is fixed, and the third planet gears are provided on the third output member so as to be in engagement with the third input gear and the third ring gear. The third input gear is provided on the first ratchet sleeve, and the third output member is engaged with the lifting wheel in a manner capable of transmitting power.

The second ratchet-pawl mechanism includes a second ratchet sleeve and second pawls. The second ratchet sleeve is fixed and provided with second one-way teeth on its inner wall surface. The second pawls are provided on the third output member and biased by second springs against the inner wall surface of the second ratchet sleeve.

In another embodiment, the first transmission means includes a first ratchet-pawl mechanism, a first planetary gear mechanism, a second planetary gear mechanism and a third planetary gear mechanism, which successively transmit power from the first output end to the lifting wheel, and the second ratchet-pawl mechanism is provided at an output end of the first planetary gear mechanism. With this arrangement, when the second output end of the motor drives rotation of the flywheel by means of the second transmission means, the first ratchet-pawl mechanism rotates idly without causing the first output end to drive the lifting wheel. That is, the first, second and third planetary gear mechanisms are not involved in this process. When the motor is stopped, the second ratchet-pawl mechanism blocks rotation of the lifting wheel corresponding to falling of the firing pin from being transferred to the first planetary gear mechanism.

Specifically, the first ratchet-pawl mechanism includes a first ratchet sleeve, a first rotating body and first pawls. The first ratchet sleeve is rotatable and provided with first one-way teeth on its inner wall surface. The first rotating body is provided on the first output end, and the first pawls are provided on the first rotating body and biased by first springs against the inner wall surface of the first ratchet sleeve.

The first planetary gear mechanism includes a first input gear, first planet gears, a first output member and a first ring gear. The first input gear is provided on the first ratchet sleeve, and the first ring gear is fixed. The first planet gears are provided on the first output member so as to be in engagement with the first input gear and the first ring gear.

The second planetary gear mechanism includes a second input gear, second planet gears, a second output member and a second ring gear. The second input gear is provided on the first output member, and the second ring gear is fixed. The second planet gears are provided on the second output member so as to be in engagement with the second input gear and the second ring gear.

The second ratchet-pawl mechanism includes a second ratchet sleeve and second pawls. The second ratchet sleeve is fixed. The second output member extends into the second ratchet sleeve, with first gaps being left between it and an inner wall surface of the second ratchet sleeve, each gradually broadening in one direction and gradually narrowing in the other direction. The second pawls are in the shape of rollers and received in the first gaps. When the second output member rotates relative to the second ratchet sleeve in the direction in which the first gaps gradually narrow, the second pawls are freely received in the first gaps, allowing the second output member to rotate in this direction. When the second output member rotates relative to the second ratchet sleeve in the direction in which the first gaps gradually broaden, the second pawls are squeezed and engaged between the second output member and the inner wall surface of the second ratchet sleeve, blocking the second output member from rotating in this direction.

The third planetary gear mechanism includes a third input gear, third planet gears, a third output member and a third ring gear. The third input gear is provided on the second output member, and the third ring gear is fixed. The third planet gears are provided on the third output member so as to be in engagement with the third input gear and the third ring gear. The third output member is engaged with the lifting wheel in a manner capable of transmitting power.

The above two embodiments of the first transmission means have demonstrated flexible configurability of the planetary gear and ratchet-pawl mechanisms.

In order to make the flywheel more powerful in filling air, the second transmission means may include a second speed-reducing mechanism, which can amplify a torque from the second output end at the flywheel. A central axis of the flywheel may be located below a central axis of the second output end, and the air pump may be arranged above the flywheel. This design can sensibly provide a space for movement of a connecting rod relative to the motor and enables a nailer body for housing those components not to be bulky. Specifically, the second speed-reducing mechanism may be an off-axis gear transmission mechanism, and the second one-way rotation mechanism may be a ratchet-pawl mechanism.

In one embodiment, the second transmission means includes the off-axis gear transmission mechanism and a third ratchet-pawl mechanism, which successively transmit power from the second output end to the flywheel. The third ratchet-pawl mechanism is configured so that the second output end, when rotating in one direction, drives the flywheel by means of the second transmission means, and so as to disengage the second output end from driving the flywheel when the second output end rotates in the other direction.

Specifically, the off-axis gear transmission mechanism includes a driving gear and a driven gear, which are in engagement with each other. The driving gear is provided on the second output end, and the driven gear is disposed below the driving gear.

The third ratchet-pawl mechanism includes a third ratchet sleeve, a third rotating body and third pawls. The third ratchet sleeve is provided on the driven gear and provided with third one-way teeth on its inner wall surface. The third rotating body is provided on flywheel, and the third pawls are provided on the third rotating body and biased by third springs against the inner wall surface of the third ratchet sleeve.

In another embodiment, the second transmission means includes a third ratchet-pawl mechanism and an off-axis gear transmission mechanism, which successively transmit power from the second output end to the flywheel. The third ratchet-pawl mechanism is configured so that the second output end, when rotating in one direction, drives the flywheel through the second transmission means, and so as to disengage the second output end from driving the flywheel when the second output end rotates in the other direction.

Specifically, the third ratchet-pawl mechanism includes a third rotating body, third pawls and a third ratchet sleeve. The third rotating body is provided on the second output end, and the third ratchet sleeve is rotatable and provided with third one-way teeth on its inner wall surface. The third pawls are provided on the third rotating body and biased by third springs against the inner wall surface of the third ratchet sleeve.

The off-axis gear transmission mechanism includes a driving gear and a driven gear, which are in engagement with each other. The driving gear is provided on the third ratchet sleeve, and the driven gear is disposed below the driving gear. The flywheel is disposed coaxially with the driven gear.

The above two embodiments of the second transmission means have demonstrated flexible configurability of the ratchet and off-axis gear transmission mechanisms.

The above object is also attained by a nail gun according to the present application, comprising:

the driving device as defined hereinabove;

a cylinder comprising a first piston, a downward-extending firing pin coupled to the first piston and a sealed chamber above the first piston, the sealed chamber configured for compressed air to be filled therein to create a gas spring, the sealed chamber defining an air exit;

an air pump for filling compressed air into the sealed chamber, the air pump comprising a second piston provided with a connecting rod eccentrically coupled to a flywheel; and a nail magazine for storing nails therein and feeding the stored nails to a location under the firing pin, wherein the driving device, the cylinder and the air pump are integrated with a handle to together form a nailer body, and the nail magazine is detachably attached to the nailer body.

This electric nail gun allows compressed gas to be filled into the sealed chamber immediately before its use and discharged from the gas spring when it is out of use (e.g., for storage, transportation, etc.), overcoming the disadvantages that may arise from permanent sealing of air in the gas spring. In addition, the proposed driving device enables a sensible structure design of the nail gun, which provides for structural compactness and low manufacturing cost.

In order to properly configure the product in terms of its center of mass, the handle may extend right rearward from a side wall of the cylinder, and a power source may be provided at a rear end of the handle. The driving device and the nail magazine may be located on opposite sides of a central plane of the handle, and the lifting wheel may be configured to be tangential to the firing pin. The air pump may be disposed at an end of the driving device away from the lifting wheel. With this arrangement, the product's center of mass is brought as close as possible to its geometric center, allowing a user to grip the handle and use the nail gun in any pose as he/she desires, without an increased burden of gripping that may be otherwise caused by a mass center offset upon a change in the nail gun's pose.

In one embodiment, the nail gun further comprises a controller for switching the motor between different directions of rotation. At the beginning of use of the nail gun, the motor is controlled to rotate in the second direction. Accordingly, the second output end drives the flywheel to rotate to cause the air pump to fill compressed air into the sealed chamber to form a gas spring. After that, the motor is controlled to rotate in the first direction. Accordingly, the first output end drives the lifting wheel to lift the firing pin and the first piston, causing the gas spring to be compressed by the first piston. The first direction is opposite to the second direction. Controlling the motor to rotate in the first direction is accomplished by manipulating a nailing switch. The lifting wheel releases the firing pin after it is raised to a predetermined position, and the gas spring then instead acts on the first piston to push the firing pin to fire a nail. With this arrangement, in order to use the nail gun, the controller can first control the nail gun to cause the air pump to fill compressed air into the sealed chamber to create a gas spring, and the motor can be then controlled to operate by rotating in the first direction to drive the lifting wheel to fire nails.

In order to control an air pressure in the gas spring, the nail gun may include a pressure sensor for detecting a pressure in the sealed chamber, or a pressure in the air pump, which is connected to the controller. In the process of the air pump filling compressed air into the sealed chamber, upon a preset value being reached, the controller may switch the motor to rotation in the first direction. In this way, the air pressure in the gas spring can be adjusted to a value that can provide power required by the firing pin to fire nails, making the product suitably applicable to various nail gauges.

In one embodiment, the nailer body is configured with a switch for controlling the motor to operate by rotating in the first or second direction. With this switch, a user can switch the motor to rotation in the first direction for firing nails, or to rotation in the second direction for filling air.

In order to control the air pressure in the gas spring, the nail gun may include a pressure gauge for detecting a pressure in the sealed chamber, or a pressure in the air pump.

Without the pressure gauge, the pressure of the gas spring can be obtained. Accordingly, when the pressure of the gas spring is undesirably higher or lower, discharging or filling of air may be conducted, respectively, to maintain the air pressure in the gas spring at a desired level.

According to the present application, power is provided to both the lifting wheel and the flywheel by the single motor. Compared with equipping the lifting wheel and the flywheel with separate motors, this allows reduced use of one motor, resulting in space savings. Thus, the driving device can be made not bulky in size, and the manufacturing cost of the product can be reduced.

According to the present application, with the aid of the first and second one-way rotation mechanisms, while the first and second output ends of the motor simultaneously output torques, only one of the lifting wheel and the flywheel is driven, while the other is disengaged from being driven. That is, when the lifting wheel is being driven, the flywheel is not driven; and when the flywheel is being driven, the lifting wheel is not driven. In this way, air filling and nailing are accomplished in different time periods, reducing workload on the motor.

According to the present application, the sealed chamber for providing the gas spring is configured with the air exit and the air pump. In this way, the electric nail gun allows compressed gas to be filled into the sealed chamber immediately before its use and discharged from the gas spring when it is out of use (e.g., for storage, transportation, etc.), overcoming the disadvantages that may arise from permanent sealing of air in the gas spring.

It is a third object of the present application to overcome the disadvantage of excessive wear and tear, jamming, damage to a firing pin lifting mechanism and/or a firing pin or something else undesirable, which may arise from the use of conventional nail guns due to a positional deviation in engagement between a firing pin lifting mechanism and a firing pin, by presenting a novel firing pin lifting mechanism and nail gun, which can ensure accurate engagement between a firing pin lifting mechanism and a firing pin, whether the firing pin, after completing a nailing cycle, deviates in position from the firing pin lifting mechanism, or not.

This object is attained by a firing pin lifting mechanism according to the present application, comprising:

a firing pin provided with teeth arranged in a lengthwise direction thereof;

a lifting wheel comprising a first portion and a second portion, the first portion provided with lifting elements, the first portion corresponding to a circumferential sector spanning a first angular range, the second portion corresponding to a circumferential sector spanning a second angular range, wherein when the lifting wheel rotates to bring the first angular range into alignment with the teeth, the lifting elements are configured to be able to engage the teeth to lift the firing pin; and when the lifting wheel rotates to bring the second angular range into alignment with the teeth, the lifting elements are configured to be able to disengage from the teeth to release the firing pin;

a movable member assembled to the lifting wheel and configured to be able to, when rotating along with the lifting wheel, move from a first position to a second position to adjust engagement of the lifting elements and the teeth; and a resilient member configured to be able to urge the movable member from the second position into the first position.

Additionally, the movable member may be assembled to the lifting wheel at a starting point of the first angular range, which is a point where the lifting elements in the first angular range start engaging the teeth during rotation of the lifting wheel for lifting the firing pin, and the movable member may comprise a force-receiving portion and engagement portion, the force-receiving portion and the engagement portion configured so that:

when the movable member is in the first position, the force-receiving portion is in a blocked position, and the engagement portion is away from an engaged position;

as the movable member rotates with the lifting wheel, the force-receiving portion is blocked by the teeth and overcomes a biasing force of the resilient member, allowing the movable member to move from the first position to the second position; and when the movable member is in the second position, the force-receiving portion is away from the blocked position, and the engagement portion is in the engaged position, where it is in the same sequence as the lifting elements for engaging the teeth.

Additionally, adjacent teeth on the firing pin may be spaced at a constant tooth pitch, wherein adjacent lifting elements on the lifting wheel are spaced at a constant pitch, and when the engagement portion is in the engaged position, where it is in the same sequence as the lifting elements for engaging the teeth, an angular distance between the engagement portion and an adjacent one of the lifting elements is equal to the pitch at which adjacent lifting elements are spaced.

Additionally, two spaced walls may define a second gap therebetween, and opposite ends of the lifting elements may be assembled to the two spaced walls, with middle portions thereof being situated within the second gap.

Additionally, the movable member may be pivotally assembled within the second gap by a pin.

Additionally, the lifting wheel may comprise a rotating shaft and a wheel body rotating together with the rotating shaft, the wheel body provided with a grease nipple thereon, the wheel body provided with grease channels therein extending from the grease nipple to the lifting elements.

Additionally, the wheel body may be provided with a grease channel therein extending from the grease nipple to the movable member.

The above object is also attained by a firing pin lifting mechanism according to the present application, comprising:

a firing pin provided with a number of teeth arranged in a lengthwise direction thereof;

a lifting wheel comprising circumferential sectors spanning respectively first and second angular ranges, wherein a number of lifting elements are provided in the first angular range; when the lifting wheel rotates to bring the first angular range into alignment with the teeth, the lifting elements come into engagement with the teeth and thereby lift the firing pin; no lifting elements are arranged in the second angular range;

and when the lifting wheel rotates to bring the second angular range into alignment with the teeth, the lifting elements disengage from the teeth, thereby releasing the firing pin;

a movable member movably assembled to the lifting wheel and configured to, when rotating along with the lifting wheel, move from a first position to a second position to adjust engagement of the lifting elements and the teeth; and a resilient member for urging the movable member to return it to the first position from the second position.

In this firing pin lifting mechanism, as the movable member provided on the lifting wheel rotates therewith, it can move from the first position to the second position to adjust engagement of the lifting elements and the teeth. With this arrangement, whether the firing pin, after completing a nailing cycle, deviates in position from the firing pin lifting mechanism, or not, accurate engagement between it and the lifting wheel can be ensured, preventing issues including excessive wear and tear of the portions of the lifting wheel and the firing pin where they come into engagement with each other, jamming and possible damage to the lifting wheel and/or the firing pin.

In this firing pin lifting mechanism, the resilient member can urge the movable member from the second position back to the first position. With this arrangement, the movable member can return to the original position after each nailing cycle is completed, maintaining the lifting wheel and the firing pin in accurate engagement every time when the firing pin is lifted by the lifting wheel.

In this firing pin lifting mechanism, only the movable member is added to the lifting wheel, substantially without causing an increase in the diameter of the lifting wheel. Therefore, the firing pin lifting mechanism is still allowed to have a compact structure.

In order for a simpler structure to be achieved, the movable member moves from the first position to the second position to adjust the lifting elements and the teeth into accurate engagement with the aid of the teeth on the firing pin, rather than a separate structure designed for this purpose. This can avoid structural complexity and may be accomplished as described below.

The movable member may be movably assembled to the lifting wheel at a location close to a starting point of the first angular range, which corresponds to a point of the first angular range where the lifting elements come into engagement with the teeth and start lifting the firing pin, during rotation of the lifting wheel. The movable member may have a force-receiving portion and an engagement portion.

The force-receiving and engagement portions may be configured so that: when the movable member is in the first position, the force-receiving portion is in a blocked position, and the engagement portion is away from an engaged position; as the movable member rotates along with the lifting wheel, the force-receiving portion is blocked by the teeth and overcome a biasing force of the resilient member, allowing the movable member to move from the first position to the second position; and when the movable member is in the second position, the force-receiving portion is away from the blocked position, and the engagement portion is in the engaged position, where it is in the same sequence as the lifting elements for engaging the teeth.

With this arrangement, following the completion of each nailing cycle, whether the firing pin deviates in position from the lifting wheel or not, as the lifting wheel rotates, the force-receiving portion can always be blocked by the teeth and overcome a biasing force of the resilient member to allow the movable member to move from the first position to the second position. Consequently, the force-receiving portion is away from the blocked position, and the engagement portion is in the engaged position, where it is in the same sequence as the lifting elements for engaging the teeth. Since the movable member is disposed on the lifting wheel at a location close to the starting point of the first angular range, the engagement portion can be first brought into engagement with the teeth, putting the lifting elements in the sequence for engaging the teeth.

In particular, in order to ensure that any of the lifting elements can come into engagement with any of the teeth, the teeth of the firing pin may be spaced at a constant tooth pitch (i.e., adjacent teeth are spaced at equal distances), and adjacent lifting elements may be spaced at a constant pitch (equal angular distances). Moreover, when the engagement portion in the engaged position, where it is in the same sequence as the lifting elements for engaging the teeth, an angular distance between the engagement portion and an adjacent lifting element may be equal to the pitch of the lifting elements. That is, the sequence for engaging the teeth is consecutive, in which the engagement portion acts just like any of the lifting elements and is located at the starting point of the sequence.

Preferably, the lifting elements are pins assembled on the lifting wheel. This allows easier manufacturing, results in manufacturing cost reductions and facilitates lubrication and replacement of the pins.

In order to enable uniform stressing of the pins and impart to them higher resistance to deformation, the lifting wheel may include two spaced walls defining a second gap therebetween. Opposite ends of the lifting elements may be assembled to the two spaced walls, with their middle portions being received in the second gap. With this arrangement, the opposite ends of the pins are stressed, and their middle portions bear loads when the firing pin is being lifted. Thus, they can be prevented from deformation.

In order to avoid the pins from coming into engagement with the teeth on the firing pin always at the same portions, which may exacerbate local wear and tear, the pins may be movably assembled to the lifting wheel, and end faces of the lifting wheel may be covered with cap plates, which confine the pins within the lifting wheel. With this arrangement, when the pins come into engagement with the teeth to lift the firing pin, as they are movable, the contact may occur at various portions thereof. Further, this can facilitate overall lubrication of the pins.

In order to balance stressing of the movable member and avoid it from being undesirably deflected upon coming into contact with the firing pin, the movable member may be swingably assembled by a pin within the second gap.

The interaction of the resilient member with the movable member may be accomplished in various ways, as described below.

In one embodiment, the lifting wheel may define arc-shaped through slots, and a rod may be inserted in the arc-shaped through slots. The resilient member may act on the rod to cause the latter to bias the movable member. The rod may be guided by the arc-shaped through slots to move along a predetermined path, thereby allowing the movable member to move within a given range. In particular, the resilient member may include first torsion spring and a second torsion spring, which are separately positioned over opposite ends of the lifting wheel to act on opposite ends of the rod. In this way, stressing of the rod is balanced, and it can apply a uniform biasing force to the movable member.

In another embodiment, the resilient member may be implemented as a tension spring coupled at opposite ends respectively to the lifting wheel and the movable member.

In a third embodiment, the resilient member may be implemented as a compression spring supported at opposite ends respectively to the lifting wheel and the movable member.

Implementing the resilient member as a tension or compression spring can additionally simplify the structure due to reduced use of components.

In order to avoid the contour of the lifting wheel from interfering with the firing pin when the second angular range is brought into alignment with the teeth as a result of rotation of the lifting wheel, the lifting wheel may have a recessed edge in the second angular range.

The above object is also attained by a nail gun according to the present application, comprising:

the firing pin lifting mechanism as defined hereinabove;

a motor for driving the lifting wheel to rotate;

a cylinder comprising a first piston, a downward-extending firing pin coupled to the first piston and a gas spring above the first piston, the gas spring configured to urge the first piston downward; and a nail magazine for storing nails therein and feeding the stored nails to a location under the firing pin.

With this arrangement, in operation of the nail gun, the motor drives the lifting wheel to rotate to lift the firing pin. As the motor continuously rotates, the firing pin is lifted and falls in repeated cycles to fire nails. Whether the firing pin, after completing a nailing cycle, deviates in position from the lifting wheel, or not, accurate engagement between it and the lifting wheel can be ensured, preventing issues including excessive wear and tear of the portions of the lifting wheel and the firing pin where they come into engagement with each other, jamming and possible damage to the lifting wheel and/or the firing pin.

The gas spring for biasing the lifted firing pin to fire a nail may be implemented in various ways, as described below.

In one embodiment, a sealed chamber is provided above the first piston, and compressed gas is permanently sealed in the sealed chamber to provide the gas spring. With this arrangement, the gas spring can always provide a biasing force and allows the nail gun to immediately fire nails once it is activated.

In another embodiment, the nail gun includes an air pump, and a sealed chamber defining an air exit is provided above the first piston. The air pump can fill compressed air into the sealed chamber to form the gas spring. Additionally, the gas spring can be destroyed by discharging the compressed air in the sealed chamber through the air exit. With this arrangement, the compressed air that provides the gas spring can be discharged when the nail gun is out of use. This can extend the lifespan of the sealed chamber and avoid potential safety hazards associated with the gas spring. Every time the nail gun is used, the air pump fills air into the sealed chamber until a desired pressure is reached in the gas spring. Such a desired pressure can vary depending on the demand.

In order for increased structural simplicity to be achieved, the motor may be configured to be rotatable in both directions. A first transmission means may be provided to enable the motor to drive the lifting wheel to rotate, and a second transmission means may be provided to enable the motor to drive the air pump. Moreover, the first and second transmission means may be configured so that, no matter in which direction the motor is rotating, only one of the lifting wheel and the air pump is driven, with the other being disengaged from being driven. With this arrangement, the single motor can be used to drive both the lifting wheel and the air pump, without mutual interference between these two functions.

According to the present application, a movable member may be provided on the lifting wheel, which is configured to, when rotating along with the lifting wheel, move from a first position to a second position to adjust engagement of the lifting elements and the teeth. With this arrangement, whether the firing pin, after completing a nailing cycle, deviates in position from the lifting wheel, or not, accurate engagement between it and the lifting wheel can be ensured, preventing issues including excessive wear and tear of the portions of the lifting wheel and the firing pin where they come into engagement with each other, jamming and possible damage to the lifting wheel and/or the firing pin.

According to the present application, a resilient member may be provided, which is configured to act on the movable member to cause it to return to the first position from the second position. In this way, the movable member can return to the original position after each nailing cycle is completed, maintaining the lifting wheel and the firing pin in accurate engagement every time when the firing pin is lifted by the lifting wheel.

According to the present application, the movable member may be provided on the lifting wheel while substantially not causing an increase in its diameter. In this way, the firing pin lifting mechanism is still allowed to have a compact structure.

According to the present application, the single motor can be used to drive both the lifting wheel and the air pump, without mutual interference between these two functions, enabling the nail gun to have an even simpler structure.

It is a fourth object of the present application to overcome the disadvantage of significant wear and tear of a firing pin lifting mechanism and a firing pin due to frequent contact and engagement therebetween, which may arise from the use of conventional nail guns, by presenting a lubricating arrangement for a firing pin lifting mechanism and a nail gun. The lubricating arrangement is used to provide lubrication to the firing pin lifting mechanism to maintain it in accurate engagement with a firing pin, reduce its wear and tear and extend its service life.

The above object is also attained by a lubricating arrangement for a firing pin lifting mechanism, according to the present application, which comprises:

- a lifting wheel for lifting a firing pin, the lifting wheel comprising a rotating shaft and a wheel body rotating with the rotating shaft, the wheel body comprising circumferential sectors spanning respectively first and second angular ranges, wherein a number of lifting elements are provided in the first angular range; when the lifting wheel rotates to bring the first angular range into alignment with the teeth, the lifting elements come into engagement with teeth on the firing pin and thereby lift the firing pin; no lifting elements are arranged in the second angular range; and when the lifting wheel rotates to bring the second angular range into alignment with the teeth, the lifting elements disengage from the teeth, thereby releasing the firing pin,
- wherein a grease nipple is provided on the lifting wheel, and the wheel body is provided with grease channels therein extending from the grease nipple to the lifting elements.

With this arrangement, the grease nipple can be used to fill lubricating grease into the grease channels, which can lubricate the lifting elements, reducing wear and tear of them occurring during their engagement with the teeth, extending their lifespans and enabling accurate engagement of them with the teeth for a long time. In addition, during use after delivery from the factory, lubricating grease can be replenished into the grease channels through the grease nipple.

In order to ensure adequate lubrication of the lifting elements by lubricating grease, the lifting elements may be provided as pins assembled on the wheel body. Each of the pins may be disposed at a port of a respective one of the grease channels.

In order to avoid loss of lubricating grease from the grease channels, in particular under the action of a centrifugal force created by rotation of the lifting wheel, axial grooves may be provided in the circumference of the wheel body. The ports of the grease channels may communicate with the respective axial grooves in which the respective pins are received. With this arrangement, when the lifting wheel rotates, the pins can block the ports of the grease channels, avoiding escape of lubricating grease therefrom due to centrifugation.

In order to ensure that the lifting elements can come into engagement with the teeth, the wheel body may include two spaced walls defining a second gap therebetween, and the circumference of the wheel body may be located at the bottom of the second gap. Opposite ends of the pins may be assembled to the two spaced walls, with their middle portions being received in the second gap. With this arrangement, when the lifting elements come into engagement with the teeth to lift the firing pin, the firing pin can be guided by the two spaced walls and confined thereby within the second gap. Thus, support can be provided to the firing pin to prevent its swinging movement.

In order for the pins to be adequately lubricated, they may be movably fitted in holes in the lifting wheel. With this arrangement, the pins can change position during their engagement with the teeth so that lubricating grease can spread across different portions of the pins.

In order to avoid the movably assembled pins from falling off the lifting wheel, end faces of the lifting wheel may be covered with cap plates, which confine the pins within the holes 1212 in the lifting wheel 120.

In order to ensure the lifting elements on the lifting wheel can accurately engage with the teeth on the firing pin without deviations, a movable member may be provided on the lifting wheel, which is configured to, when rotating along with the lifting wheel, be switched between different positions to adjust the lifting elements and the teeth on the firing pin into accurate engagement. The wheel body may define a further grease channel extending from the grease nipple to the movable member, through which lubricating grease can be filled to lubricate the movable member.

Additionally, an arc-shaped recess may be provided in the circumference of the wheel body, in which an arc-shaped rotating portion of the movable member is seated. A port of the grease channel may communicate with the arc-shaped recess. With this arrangement, lubricating grease from the grease channel can lubricate not only movement of the movable member itself but also its engagement with the firing pin.

In order to avoid the movable member from engaging with the firing pin with any deviation in position, the wheel body may include two spaced walls defining a second gap therebetween, and the circumference of the wheel body may be located at the bottom of the second gap. The movable member may be disposed within the second gap while being rotatably assembled by a pin to the two spaced walls. With this arrangement, when the lifting elements come into engagement with the teeth to lift the firing pin, firing pin and the movable member can be guided by the two spaced walls and confined thereby within the second gap. Thus, support can be provided to the firing pin to prevent its swinging movement. Further, the movable member can be restricted in position from deviating from accurate engagement with the firing pin.

In order to facilitate manufacturing and enable lubricating grease to be filled into each of the grease channels through the grease nipple, the grease channels may radiate from the center of the wheel body.

The rotating shaft may define an axial bore connected to the grease channels, and the grease nipple may be provided at one end of the rotating shaft. With this arrangement, as the grease nipple rotates with the lifting wheel, the lifting wheel can be dynamically balanced and located at a determined position. Thus, an external device such as a grease gun can be easily connected to the grease nipple to allow for filling of lubricating grease.

In order to avoid leakage of lubricating grease from the grease nipple, the grease nipple may include a cap, a ball and a spring. The cap may define a grease inlet port, and the ball 152 may be supported by the spring to block the grease inlet port. Thus, the grease nipple can function like a one-way valve allowing grease only to be filled into the grease channels.

The above object is also attained by a nail gun according to the present application, comprising:

- a firing pin lifting mechanism comprising a firing pin and a lifting wheel for lifting the firing pin, the firing pin defining a plurality of teeth arranged in its lengthwise direction, the firing pin lifting mechanism provided with the lubricating arrangement as defined above;
- a motor for driving the lifting wheel to rotate;
- a cylinder comprising a first piston, a downward-extending firing pin coupled to the first piston and a gas spring above the first piston, the gas spring configured to urge the first piston downward; and
- a nail magazine for storing nails therein and feeding the stored nails to a location under the firing pin.

With this arrangement, engaging portions of the lifting wheel and the firing pin can be lubricated during nailing of the nail gun, reducing wear and tear of the lifting wheel and the firing pin occurring during their engagement, extending their lifespans and enabling accurate engagement of them for a long time.

In order to facilitate filling of lubricating grease into the grease channels through the grease nipple, the grease nipple may be concealed within a nailer body, and a through hole corresponding to the grease nipple may be provided in the nailer body and covered by a lid.

According to the present application, lubricating grease can be filled through the grease nipple on the lifting wheel into the grease channels extending from the grease nipple to the lifting elements to lubricate the lifting elements, thereby reducing wear and tear of the lifting wheel and the firing pin occurring during their engagement, extending their lifespans and enabling accurate engagement of them for a long time. Further, during use after delivery from the factory, lubricating grease can be replenished into the grease channels through the grease nipple.

LIST OF REFERENCE NUMERALS

Figure 1:
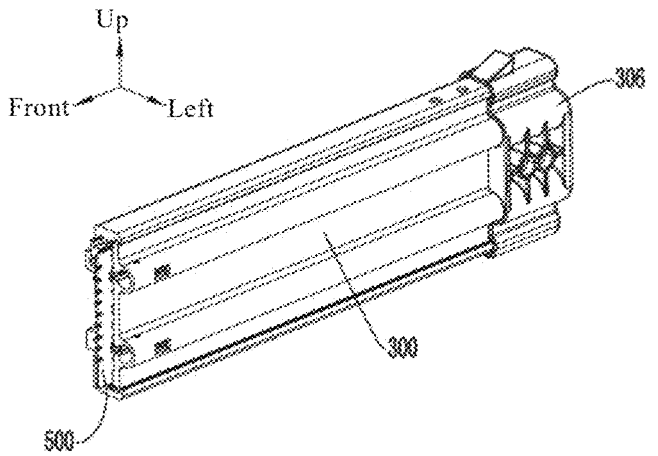
FIG. 1 is an axonometric view of a nail magazine device according to the present application.
Figure 2:
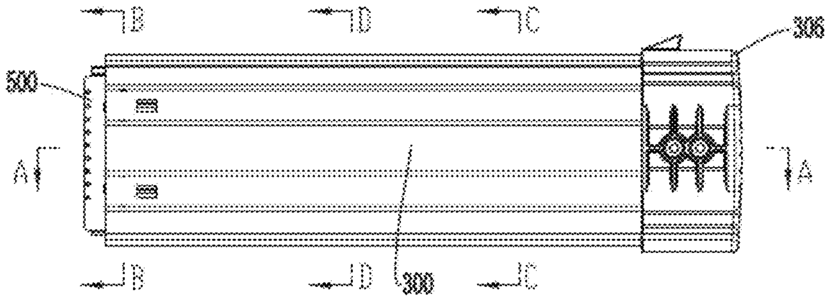
FIG. 2 schematically illustrates an orthographic projection of the nail magazine device of FIG. 1.
Figure 3:
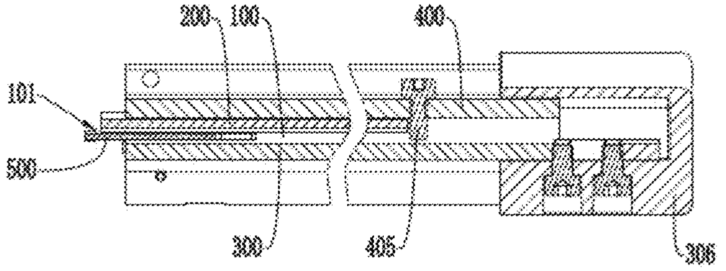
FIG. 3 is an enlarged cross-sectional view taken along A-A of FIG. 2.
Figure 4:
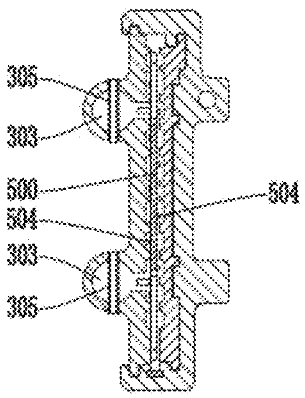
FIG. 4 is an enlarged cross-sectional view taken along B-B of FIG. 2.
Figure 5:
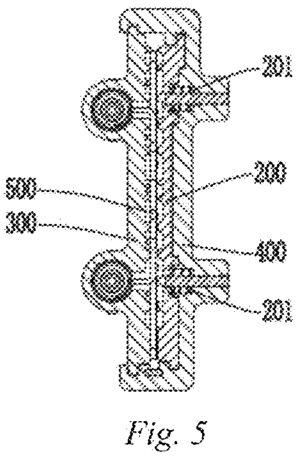
FIG. 5 is an enlarged cross-sectional view taken along C-C of FIG. 2.
Figure 6:
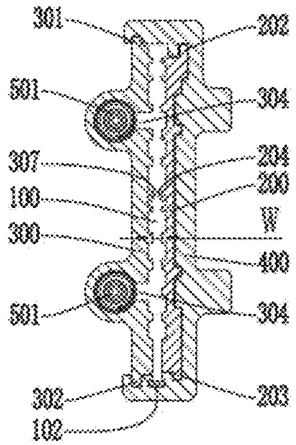
FIG. 6 is an enlarged cross-sectional view taken along D-D of FIG. 2.
Figure 7:
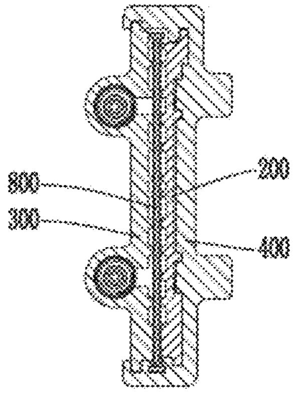
FIG. 7 is a schematic diagram showing the nail chamber of FIG. 6, in which gun nails are stored.
Figure 8:
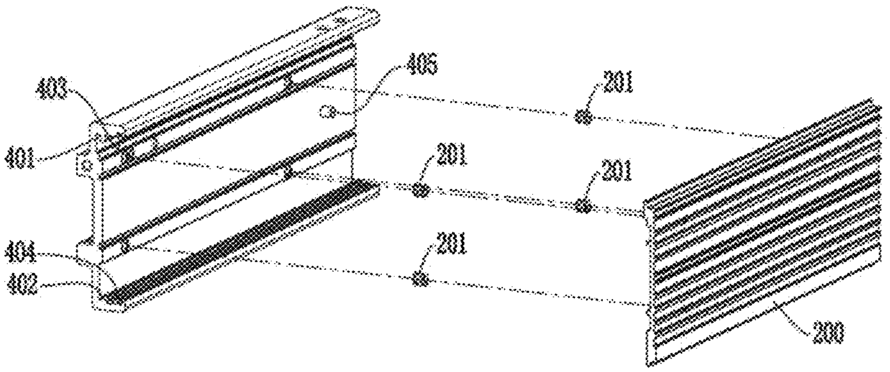
FIG. 8 schematically illustrates assembly of a movable member with a side wall.
Figure 9:
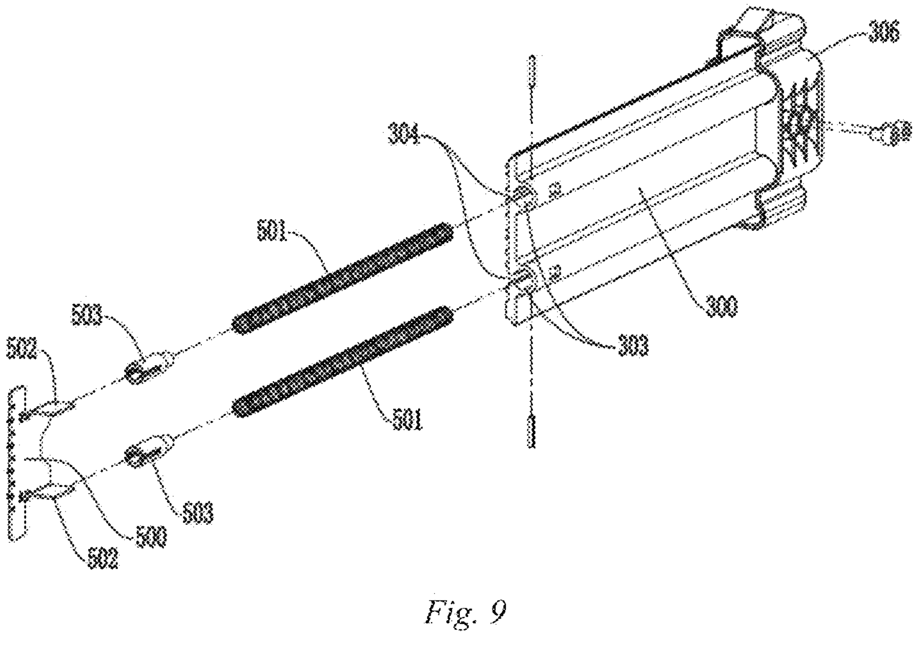
FIG. 9 is a schematic structural view of a cover.
Figure 10:
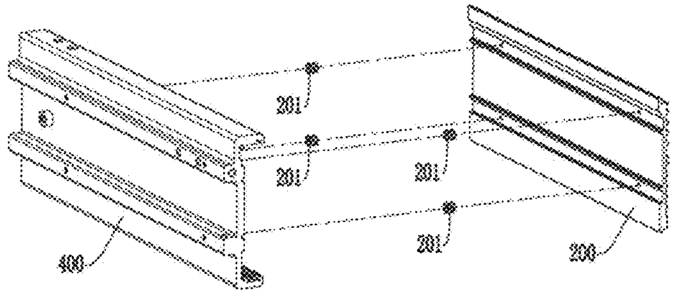
FIG. 10 is a schematic diagram of the structure of FIG. 8 from a different perspective angle.
Figure 11:
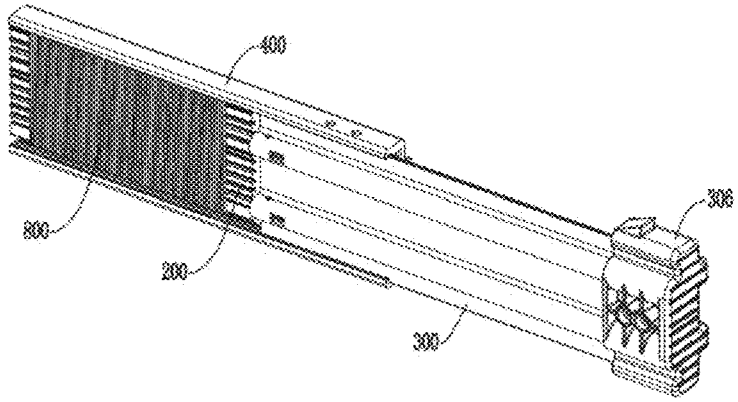
FIG. 11 is a schematic diagram showing the nail magazine device of FIG. 1, in which the cover is opened, allowing gun nails to be loaded into the nail chamber.

100 nail chamber; 101 exit; W width of nail chamber; 102 support strip;
200 movable member; 201 first resilient element; 202 upper edge of movable member; 203 lower edge of movable member; 204 first groove;
300 cover; 301 upper edge of cover; 302 lower edge of cover; 303 receptacle bore; 304 slit; 305 second stop pin; 306 trailing cap; 307 second groove; 308 protrusion;
400 side wall; 401 upper engagement groove; 402 lower engagement groove; 403 upper slide groove; 404 lower slide groove; 405 first stop pin;
500 abutment member; 501 second resilient element; 502 leg; 503 push post; 504 deformable element;
600 gun body; 601 striking chamber; 602 hook;
700 nail magazine device;
800 gun nail;
10 firing pin lifting mechanism:
110 firing pin; 111 tooth; S tooth pitch;
120 lifting wheel; 121 lifting element; 122 wall; 123 second gap; 124 cap plate; 125 arc-shaped through slot; 126 rod; 127 rotating shaft; 128 wheel body; 129 grease channel; 1201 truncated portion; 1210 axial groove; 1211 port of grease channel; 1212 hole; 1213 arc-shaped recess; 1214 axial bore; $\alpha$ first angular range; $\beta$ second angular range; $\delta$ pitch between lifting elements; $\theta$ angular distance between engagement portion and adjacent lifting element;
130 movable member; 131 force-receiving portion; 132 engagement portion; 133 pin; 134 arc-shaped rotating portion;
141 first torsion spring; 142 second torsion spring; 143 tension spring; 144 compression spring;
150 grease nipple: 151 cap; 152 ball; 153 spring; 154 grease inlet port;
20 driving device;
210 motor: 2101 first output end; 2102 second output end;
220 first transmission means:
2210 first ratchet-pawl mechanism: 2211 first ratchet sleeve; 2212 first pawl; 2213 first one-way tooth; 2214 first spring; 2215 first rotating body;
2220 second ratchet-pawl mechanism: 2221 second ratchet sleeve; 2222 second pawl; 2223 second one-way tooth; 2224 second spring; 2225 first gap;
2230 first planetary gear mechanism: 2231 first input gear; 2232 first planet gear; 2233 first output member; 2234 first ring gear;
2240 second planetary gear mechanism: 2241 second input gear; 2242 second planet gear; 2243 second output member; 2244 second ring gear;
2250 third planetary gear mechanism: 2251 third input gear; 2252 third planet gear; 2253 third output member; 2254 third ring gear;
230 second transmission means:
2310 off-axis gear transmission mechanism: 2311 driving gear; 2312 driven gear;
2320 third ratchet-pawl mechanism: 2321 third ratchet sleeve; 2322 third rotating body;
2323 third pawl; 2324 third one-way tooth; 2325 third spring;
240 flywheel;
30 cylinder: 310 first piston; 320 sealed chamber; 330 air exit; 325 pressure gauge;
40 nail magazine; 410 nail; 420 gun nozzle;
50 air pump: 510 air hose; 531 second piston; 532 connecting rod;
60 handle; 610 power source; 620 nailing switch;
70 nailer body; 701 through hole; 702 lid.

DETAILED DESCRIPTION OF THE PREFERRED EMBODIMENTS

Embodiments of the present invention will be described clearly and fully hereunder in conjunction with the appended drawings so that objects, aspects and advantages of the invention will become more apparent. Evidently, the embodiments set forth herein are merely some but not all possible embodiments of this invention. Any and all other embodiments devisable by skilled artisans in light of the disclosed embodiments without paying any creative effort are considered to fall within the scope of protection of this invention.

As used herein and in the appended claims, the terms "comprises", "comprising", "includes", "including", "has", "having", or any other variation thereof, are intended to cover a non-exclusive inclusion. For example, a method or product that comprises a list of features is not necessarily limited to only those features but may include other features not expressly listed or inherent to such method or product.

It is to be noted that the terms "up", "down", "left", "right", "front", "rear" and so on may be used herein to describe orientations or positional relationships as viewed in the annexed figures. They are for convenience and ease of description of the present invention only and do not indicate or imply that the described apparatus or element must assume, or be constructed or operated in, a particular orientation. Therefore, they are not to be construed as limiting the present invention. Each of the pairs of "up" and "down", "left" and "right" and "front" and "rear" each refers to a pair of opposite directions.

It is to be noted that, the ordinal terms "first", "second", etc., may be used herein to describe elements. These terms are only used to illustrate the elements clearly and distinguish one element from another, and are not intended to imply that the elements are so termed in practice. Therefore, they should not be construed as limiting the present invention in any way.

The present invention is described in detail below with reference to the accompanying drawings, which illustrate specific embodiments thereof.

In one embodiment, as shown in FIGS. 1 to 11, a nail magazine device includes a side wall 400, a movable member 200 and a cover 300. The cover 300 is provided on the side wall 400 so that the two enclose an internal space therebetween, in which the movable member 200 is received. The movable member 200 is oriented with its first side surface facing the side wall 400 and second side surface toward the cover 300. The internal space between the movable member 200 and the cover 300 provides a nail chamber 100 for receiving gun nails 800. The cover 300 is configured to be openable and closable with respect to the side wall 400 to open or close the nail chamber 100. The movable member 200 is configured to be able to adjust a width of the nail chamber 100.

The nail magazine device further includes first resilient elements 201. A first end of each first resilient element 201 is coupled to the first side surface of the movable member 200, and a second end thereof is coupled to the side wall 400.

Optionally, the side wall 400 may have edge lips, and the cover 300 is slidably provided on the edge lips of the side wall 400.

The nail magazine device further includes a trailing cap 306 disposed over a rear portion of the cover 300. The trailing cap 306 is configured to be able to, during frontward movement of the cover 300, abut against a rear end of the side wall 400 to block the cover 300 from further frontward movement.

The nail magazine device further includes an abutment member 500 and second resilient elements 501. The abutment member 500 is provided in the nail chamber 100. Front ends of the second resilient elements 501 are coupled to the abutment member 500, and rear ends of the second resilient elements 501 are coupled to the trailing cap 306.

The cover 300 defines receptacle bores 303 extending frontward and rearward. The second resilient elements 501 are provided in the receptacle bores 303. The receptacle bores 303 have slits 304 in communication with the nail chamber 100. The abutment member 500 has legs 502, which extend through the slits 304 into the receptacle bores 303. The front ends of the second resilient elements 501 are coupled to the legs 502.

The movable member 200 functions to press gun nails 800 in the nail chamber 100 against the cover 300, making a width W of the nail chamber 100 just suitable for the gauge of the stored gun nails, without jamming or double firing. Moreover, the cover 300 functions to fix gun nails 800 in position, ensuring that gun nails 800 of any gauge can be output from an exit 101.

FIGS. 1 to 11 show the side wall 400, the movable member 200, the cover 300 and the abutment member 500 in the nail magazine device.

Here, "frontward" refers to a direction pointing from the trailing cap 306 to the abutment member 500, and "rearward" refers to a direction pointing from the abutment member 500 to the trailing cap 306. "Leftward" refers to a direction pointing from the side wall 400 to the cover 300, and "rightward" refers to a direction pointing from the cover 300 to the side wall 400. "Upward" refers to a direction out of the page, and "downward" refers to a direction into the page.

The side wall 400 has leftward-bent upper and lower edge lips along its upper and lower edges and thereby generally resembles a trough. The upper edge lip defines an upper engagement groove 401 and an upper slide groove 403. The lower edge lip defines a lower engagement groove 402 and a lower slide groove 404. The upper engagement groove 401 is in correspondence with the lower engagement groove 402. The upper slide groove 403 is in correspondence with the lower slide groove 404. The side wall 400 has a left side surface, and a hole is provided around each of the four corners thereof. Guide posts are provided in the respective holes, and the first resilient elements 201 are provided over the respective guide posts. The first resilient elements 201 are helical compression springs. A bolt is coupled to the side wall 400 to provide a first stop pin 405, which extends in the nail chamber 100.

The movable member 200 is in the shape of a plate having a first (right) side surface and a second (left) side surface. An upper edge 202 of the movable member is located in the upper engagement groove 401, and a lower edge 203 of the movable member is located in the lower engagement groove 402. The upper engagement groove 401 has a width greater than a thickness of the movable member at the upper edge 202, and the lower engagement groove 402 has a width greater than a thickness of the movable member at the lower edge 203. In this way, the movable member 200 is allowed to move leftward and rightward while being confined in the grooves. The movable member 200 defines guide slots, and guide posts are inserted in the respective guide slots in one-to-one correspondence to guide the leftward and rightward movement of the movable member 200 while restricting it from moving frontward, rearward, upward or downward. A number of first grooves 204 extending frontward and rearward are provided in the (left) side surface facing the nail chamber 100.

The cover 300 is in the shape of a plate having a left side surface and a right side surface. An upper edge 301 of the cover is located in the upper slide groove 403, and a lower edge 302 of the cover is located in the lower slide groove 404. In this way, the cover 300 is assembled with the side wall 400 so as to be slidable frontward and rearward to open and close the nail chamber 100. The movable member 200 is situated between the cover 300 and the side wall 400, and the first (left) and second (right) ends of the first resilient elements 201 are supported on the movable member 200 and the side wall 400, respectively, biasing the movable member 200 leftward, i.e., toward the cover 300. The movable member 200 and the cover 300 delimit the nail chamber 100 therebetween, and the nail chamber 100 defines the exit 101 at its front end. The width W of the nail chamber 100 is defined leftward and rightward as the smallest gap width between the movable member 200 and the cover 300. That is, the width of the nail chamber 100 is defined by the movable member 100 and the cover 300. Moreover, it is adjustable as a result of movement of the movable member 200. Further, the biasing of the first resilient elements 201 against the movable member 200 tends to bring the movable member 200 closer to the cover 300.

A number of second grooves 307 extending frontward and rearward are provided in the (right) side surface of the cover 300 facing the nail chamber 100. The first grooves 204 are in one-to-one correspondence with the respective second grooves 307. When gun nails 800 are loaded in the nail chamber 100, their head portions are received in the respective first 204 and second 307 grooves. This can avoid nail jamming.

A main body of the abutment member 500 is in the shape of a plate. The abutment member 500 is located in the nail chamber 100 and used to be biased by the second resilient elements 501 frontward and thereby in turn bias and push gun nails 800 in the nail chamber 100 frontward. The abutment member 500 is assembled with the cover 300 so as to be movable therewith. Moving the cover 300 rearward will open the nail chamber 100, and moving the cover 300 frontward will close the nail chamber 100.

The cover 300 may define two receptacle bores 303 extending frontward and rearward, and the second resilient elements 501 may be helical compression springs provided in the receptacle bores 303. The legs 502 of the abutment member 500 extend through the slits 304 of the receptacle bores 303, which are in communication with the nail chamber, into the receptacle bores 303, thereby enabling the biasing of the second resilient elements 501. Specifically, the second resilient elements 501 may bias the legs 502 via push posts 503 located in the receptacle bores 303. Front ends of the push posts 503 engage with the legs 502, and the second resilient elements 501 fit over rear ends of the push posts 503.

Second stop pins 305 are inserted through the receptacle bores 303 at a front portion of the cover 300, and the trailing cap 306 is disposed over a rear portion of the cover 300. The second resilient elements 501 and the legs 502 of the abutment member 500 are confined between the second stop pins 305 and the trailing cap 306. During frontward movement of the cover 300, the trailing cap 306 will come into abutment against the rear end of the side wall 400, blocking the cover 300 from further frontward movement and hence fixing it in position. At the same time, the first stop pin 405 blocks the abutment member 500 from moving rearward, preventing the cover 300 from rearward sliding off the side wall 400. Thus, while the cover 300 is movable frontward and rearward relative to the side wall 400, it remains in assembly with the side wall 400 without separating therefrom. This allows a user to move the cover 300 frontward and rearward at will to open and close the nail chamber 100. In other embodiments, the first stop pin 405 can be directly used to block the cover 300 from sliding off the side wall 400.

On a front end face of the abutment member 500, deformable elements 504 are provided, which protrude from left and right sides thereof to enlarge a contour of the abutment member 500 for contacting and abutting against gun nails 800. The deformable elements 504 are provided in the first grooves 204 and the second grooves 307 at opposite sides of the nail chamber 100, which are provided by the movable member 200 and the cover 300.

A support strip 102 is provided at the bottom of the nail chamber 100 to support gun nails 800 in the nail chamber 100. The support strip 102 is replaceable. The support strip 102 is assembled over the lower edge lip of the side wall 400.

Figure 12:
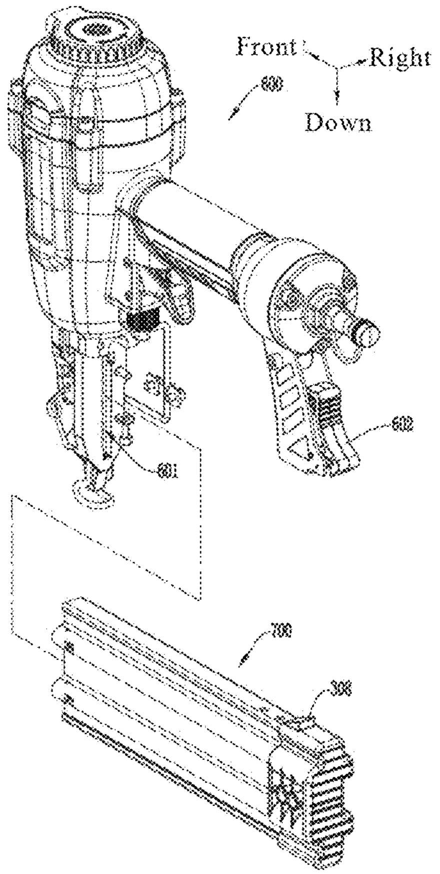
FIG. 12 schematically illustrates how the nail magazine device is configured on a gun body.
Figure 13:
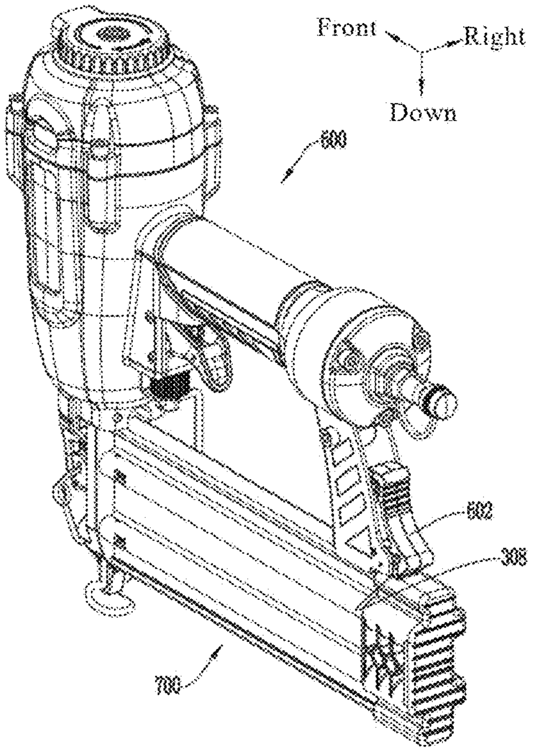
FIG. 13 schematically illustrates the nail magazine device that has been configured on the gun body.

In one embodiment, there is also provided a nail gun, which, as shown in FIGS. 12 to 13, includes a gun body 600 and the nail magazine device 700 as described above. The gun body 600 defines a striking chamber 601, and the nail magazine device 700 is assembled with the gun body 700, with the exit 101 of the nail chamber 100 being fitted with the striking chamber 601.

The nail magazine device 700 feeds gun nails 800 into the striking chamber 601 to enable consecutive firing of them.

As shown in FIGS. 12 to 13, the nail magazine device 700 of FIGS. 1 to 11 can be used with the gun body 600 to form the nail gun. The gun body 600 defines the striking chamber 601, and the side wall 400 of the nail magazine device 700 is secured to the gun body 600 by fasteners such as bolts, with the exit 101 of the nail chamber being fitted with the striking chamber 601. During nailing, the nail magazine device 700 feeds gun nails 800 to the striking chamber 601 through the exit 101.

The cover 300 is locked by an unlockable locking structure in a position where it covers the nail chamber 100. The locking means includes a hook 602 on the gun body 600 and a protrusion 308 on the trailing cap. The hook 602 is biased by a spring to hook the protrusion 308, as shown in FIG. 13, locking the cover 300 in the position where it covers the nail chamber 100. In order to load gun nails 800 into the nail chamber 100, the other end of the hook 602 is pressed to disengage the hook 602 from the protrusion 308, allowing the cover 300 to be slid rearward. As a result, the abutment member 500 is moved rearward, exposing the nail chamber 100. At this time, desired gun nails 800 (typically collated) can be placed into the nail chamber 100. After that, the cover 300 is slid frontward until the hook 602 again hooks the protrusion 308 and thereby locks the cover 300. As the cover 300 moves frontward, the second resilient elements 501 are compressed to bias the gun nails 800 frontward, allowing them to be pushed into the striking chamber 601 from the nail chamber 100 and then fired one by one.

The nail magazine device can adapt the width of the nail chamber to a wire diameter of a particular nail. Therefore, gun nails of different wire diameters can be loaded in the single nail chamber and smoothly fed frontward by the single abutment member.

This nail magazine device has a simpler structure and overcomes the problem of possible loading of incorrect nails. In addition to a simple structure, it also lowers accuracy requirements. The single nail gun allows a user to fire gun nails of at least two different wire diameters, resulting in significant cost reductions.

In one embodiment, as shown in FIGS. 31 to 44, a driving device 20 is configured to be able to rotate in a first (clockwise) direction to drive a lifting wheel 120 to lift a firing pin 110 over a first period of time, and to rotate in a second (counterclockwise) direction to drive an air pump 50 to fill air into a cylinder 30 over a second period of time that is different from the first period of time.

In the second period of time, the air pump 50 fills air into a sealed chamber 320 of the cylinder 30 to form a gas spring. In the first period of time, the lifting wheel 120 lifts and releases the firing pin 110 to accomplish one nailing action, once per its revolution.

In one embodiment, the driving device 20 includes a motor 210, a first transmission means 220 and a second transmission means 230.

The motor 210 has a first output end 2101 and a second output end 2102. The first output end 2101 and the second output end 2102 of the motor 210 are respectively provided by opposite ends of a shaft of the motor 210. The first output end 2101 and the second output end 2102 rotate in the same direction.

The first transmission means 220 is provided between the first output end 2101 of the motor 210 and the lifting wheel 120. The first transmission means 220 includes a first one-way rotation mechanism and is configured so that the first output end 2101, when rotating in the first direction, drives the lifting wheel 120 through the first transmission means 220 and that, when the first output end 2101 rotates in the second direction, the first one-way rotation mechanism disengages the first output end 2101 from driving the lifting wheel 120.

The second transmission means 230 is provided between the second output end 2102 of the motor 210 and the air pump 50. The second transmission means 230 includes a second one-way rotation mechanism and is configured so that the second output end 2102, when rotating in the second direction, drives the air pump 50 through the second transmission means 230 and that, when the second output end 2102 rotates in the first direction, the second one-way rotation mechanism disengages the second output end 2102 from driving the air pump 50.

The first transmission means 220 further includes a first speed-reducing mechanism. The lifting wheel 120, the first speed-reducing mechanism and the first one-way rotation mechanism are coaxially disposed with the first output end 2102. The first speed-reducing mechanism is a planetary gear mechanisms with coaxial input and output ends, and the first one-way rotation mechanism is a ratchet-pawl mechanism.

In one embodiment, the first one-way rotation mechanism includes a first ratchet-pawl mechanism 2210 configured to be able to: come into engagement to drive the lifting wheel 120 when the first output end 2101 rotates in the first direction; and rotate idly to disengage the first output end 2101 from driving the lifting wheel 120 when the first output end 2101 rotates in the second direction.

In one embodiment, the first one-way rotation mechanism further includes a second ratchet-pawl mechanism 2220 configured to be able to: rotate idly when the first output end 2101 rotates in the first direction to drive the lifting wheel 120 through the first transmission means 220; and when the lifting wheel 120 tends to rotate in the second direction, come into engagement to block the lifting wheel 120 from rotating in the second direction.

The second transmission means 230 further includes a second speed-reducing mechanism and a flywheel 240. The flywheel 240 is configured to be able to drive the air pump 50 to fill air into the cylinder 30. A central axis of the flywheel 240 is located below a central axis of the second output end 2102. The second speed-reducing mechanism is an off-axis gear transmission mechanism, and the second one-way rotation mechanism is a ratchet-pawl mechanism.

The second transmission means 230 includes an off-axis gear transmission mechanism 2310 and a third ratchet-pawl mechanism 2320, which successively transmit power from the second output end 2102 to the flywheel 240. The third ratchet-pawl mechanism 2320 is configured so that the second output end 2102, when rotating in the second direction, drives the flywheel 240 through the second transmission means 230, and so as to disengage the second output end 2102 from driving the flywheel 240 when the second output end 2102 rotates in the first direction.

Figure 14:
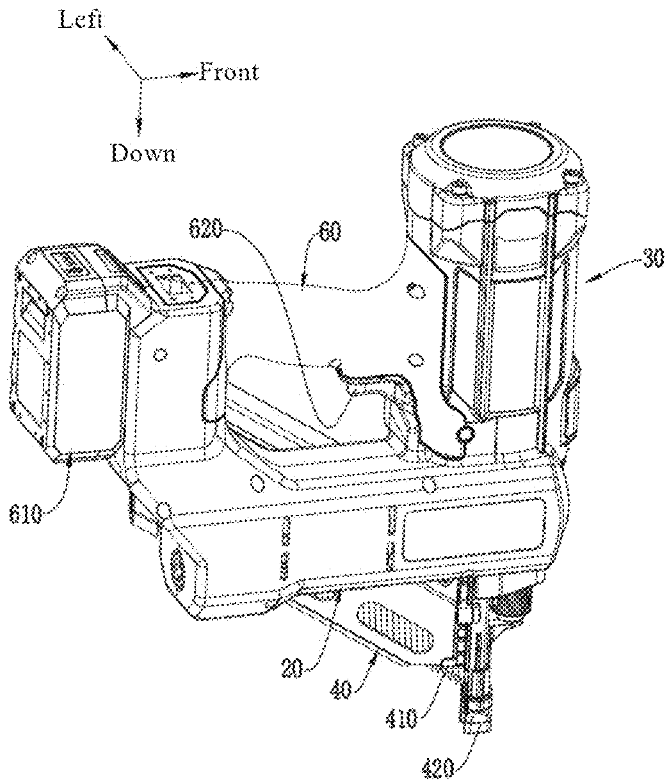
FIG. 14 is an axonometric view of a nail gun according to the present application.
Figure 15:
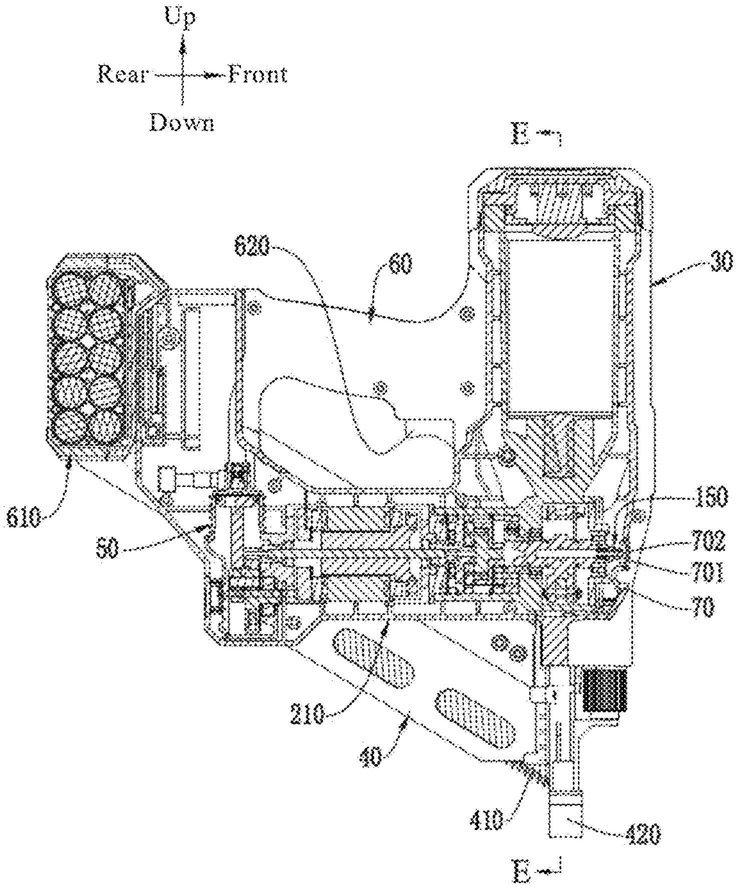
FIG. 15 is a schematic cross-sectional view of the nail gun of FIG. 14.
Figure 16:
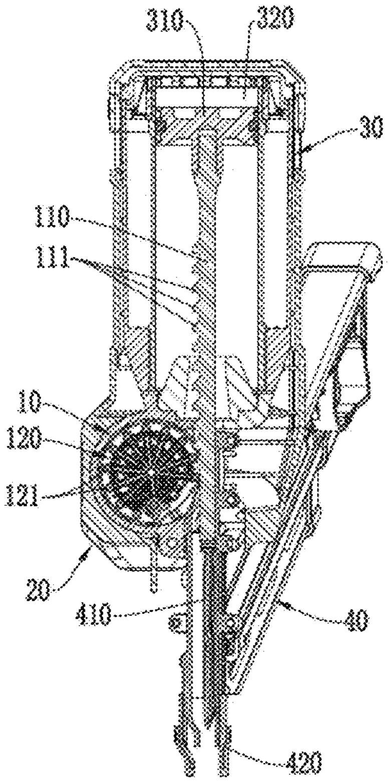
FIG. 16 is a cross-sectional view taken along E-E of FIG. 15, in which a firing pin has been lifted by a lifting wheel to an uppermost position.

In one embodiment, as shown in FIGS. 14 to 16, an electric nail gun includes a firing pin lifting mechanism 10, the driving device 20, the cylinder 30, a nail magazine 40, the air pump 50 and a handle 60.

Here, "frontward" refers to a direction pointing from a power source 610 to the cylinder 30, and "rearward" refers to a direction pointing from the cylinder 30 to the power source 610. "Leftward" refers to a direction pointing from the driving device 20 to the nail magazine 40, and "rightward" refers to a direction pointing from the nail magazine 40 to the driving device 20. "Upward" refers to a direction out of the page, and "downward" refers to a direction into the page. "Clockwise" refers to a direction of rotation from the flywheel 240 to the lifting wheel 120, and "counter-clockwise direction" refers to a direction of rotation from the flywheel 240 to the lifting wheel 120.

The firing pin lifting mechanism 10 is used to lift the firing pin 110 and compress the gas spring. Its structure is described in detail below.

Figure 31:
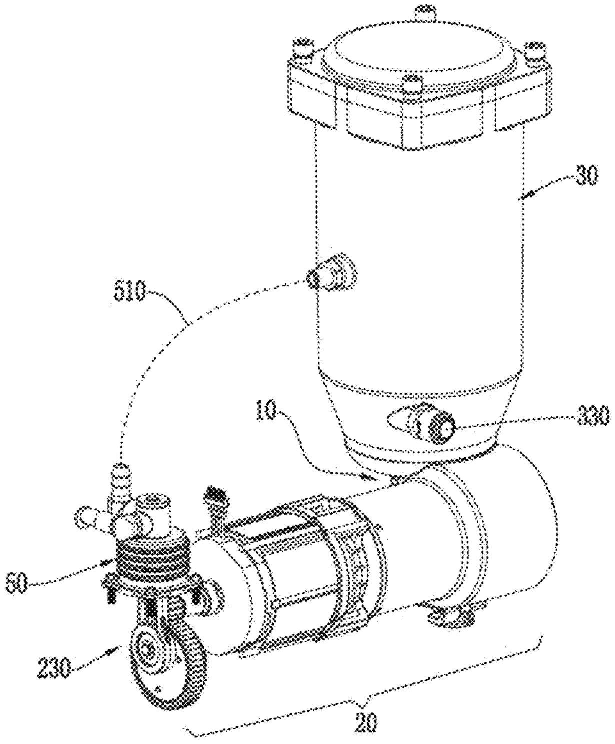
FIG. 31 is a schematic assembly view of a driving device, an air pump and a cylinder according to the present application.
Figure 32:
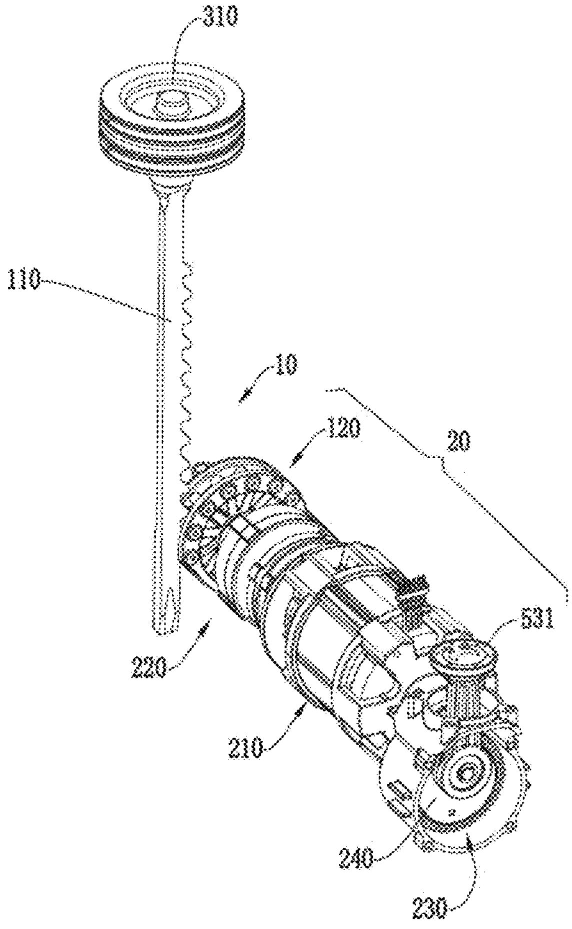
FIG. 32 schematically illustrates driving of a firing pin by the driving device.

As shown in FIGS. 31 to 32, the driving device 20 is composed of the motor 210, the first transmission means 220 and the second transmission means 230. The motor 210 is used to drive the lifting wheel 120 to rotate, and to drive the air pump 50 to fill air into the gas spring. Specifically, the motor 210 is configured to be rotatable in both directions. At the front end of the motor 210, the output shaft thereof drives the lifting wheel 120 to rotate through the first transmission means 220. At the rear end of the motor 210, the output shaft thereof drives the air pump 50 through the second transmission means 230 via the flywheel 240. The first transmission means 220 and the second transmission means 230 are configured so that, regardless of which direction the motor 210 rotates in, one of the lifting wheel 120 and the air pump 50 is driven, and the other is disengaged from being driven. That is, when the lifting wheel 120 is being driven, the air pump 50 is not driven; and when the air pump 50 is being driven, the lifting wheel 120 is not driven. The first transmission means 220 and the second transmission means 230 are both mechanical transmission structures.

A first piston 310 is provided in the cylinder 30, and the firing pin 110 is coupled to the first piston 310 and extends downward therefrom. The gas spring is provided on top of the first piston 310 and used to push the first piston 310 downward. As the lifting wheel 120 lifts the firing pin 110, the first piston 310 moves upward to compress the gas spring. After the firing pin 110 is released from the lifting wheel 120, the gas spring biases the first piston 310 to cause it to move with the firing pin 110 downward to perform a nailing action.

The nail magazine 40 is used to store nails 410 and feed them to a gun nozzle 420 positioned under the firing pin 110.

Figure 33:
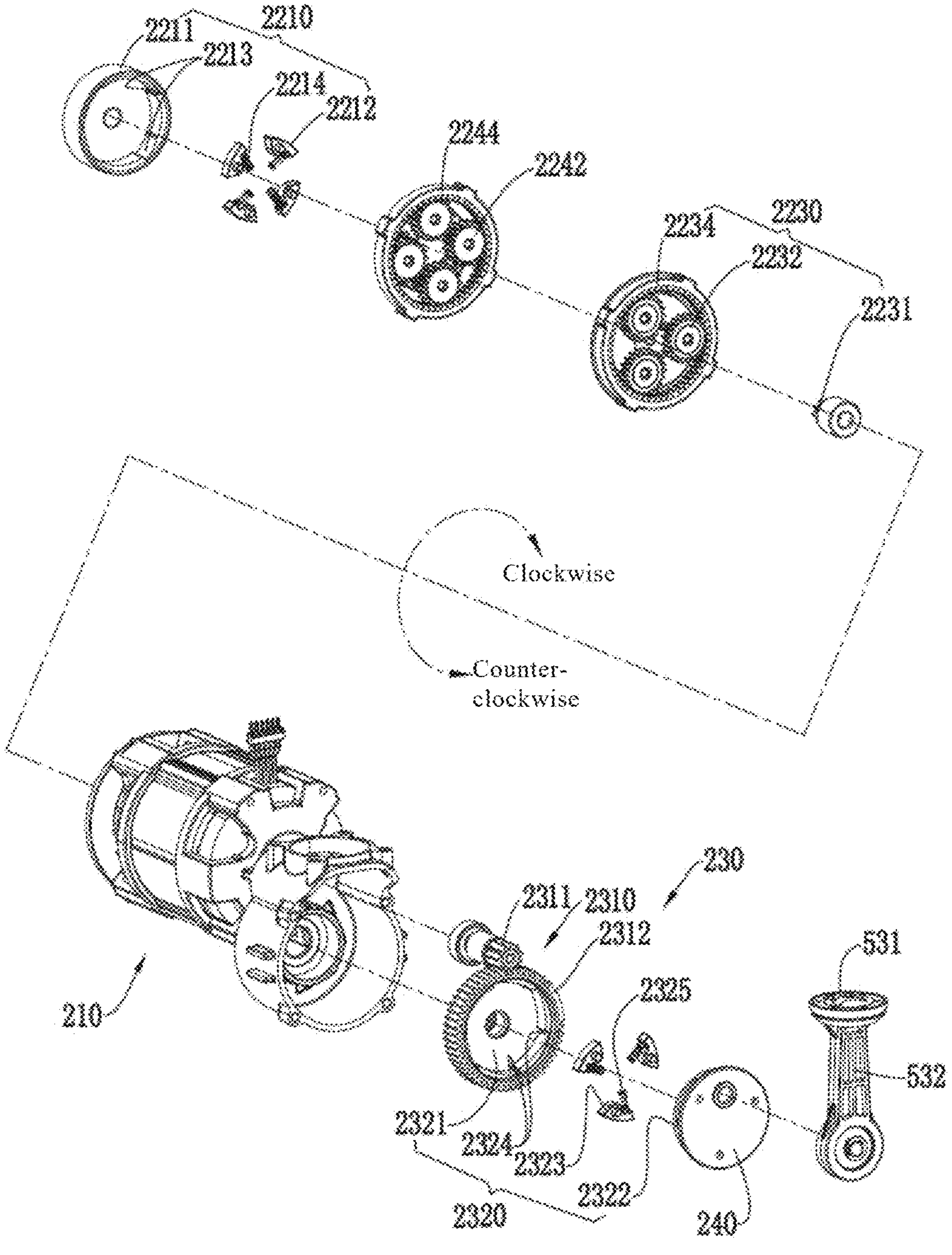
FIG. 33 is a schematic exposed view of the air pump and part of the driving device in the structure of FIG. 32.
Figure 34:
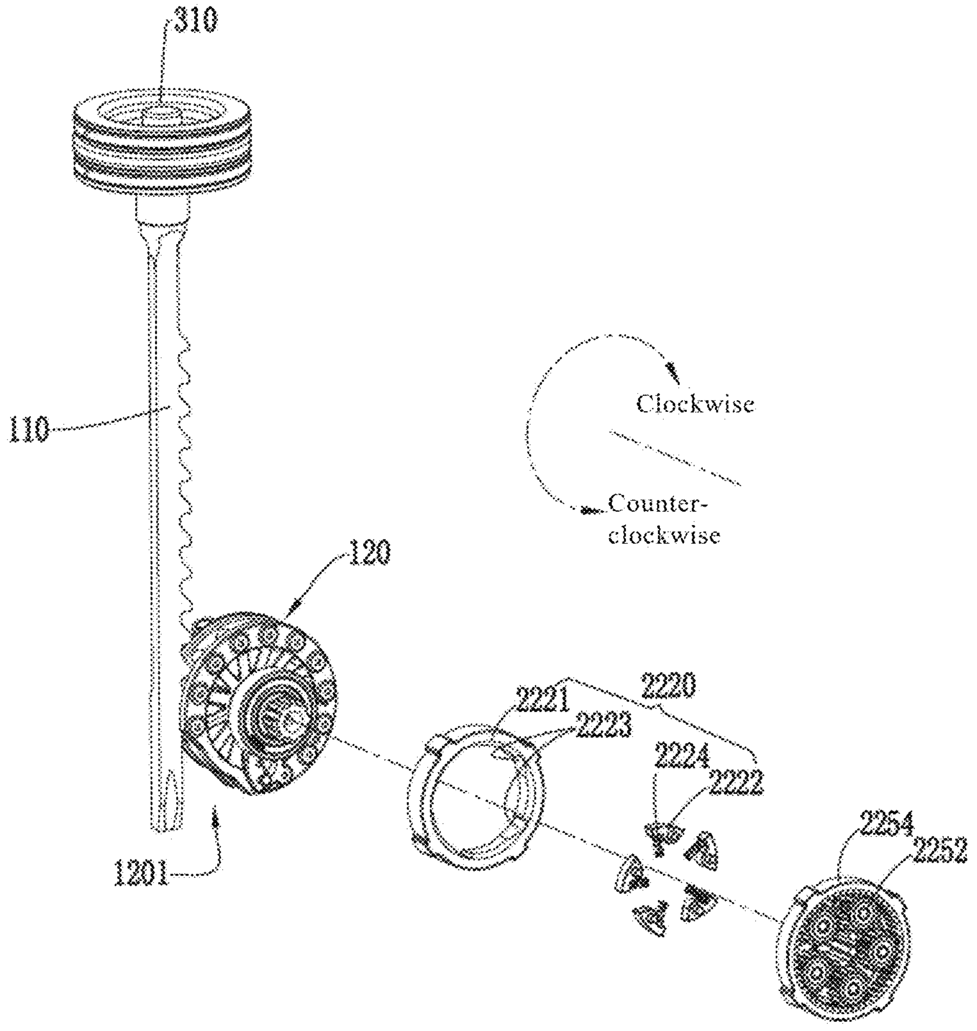
FIG. 34 is a schematic exposed view of part of the driving device in the structure of FIG. 32.
Figure 35:
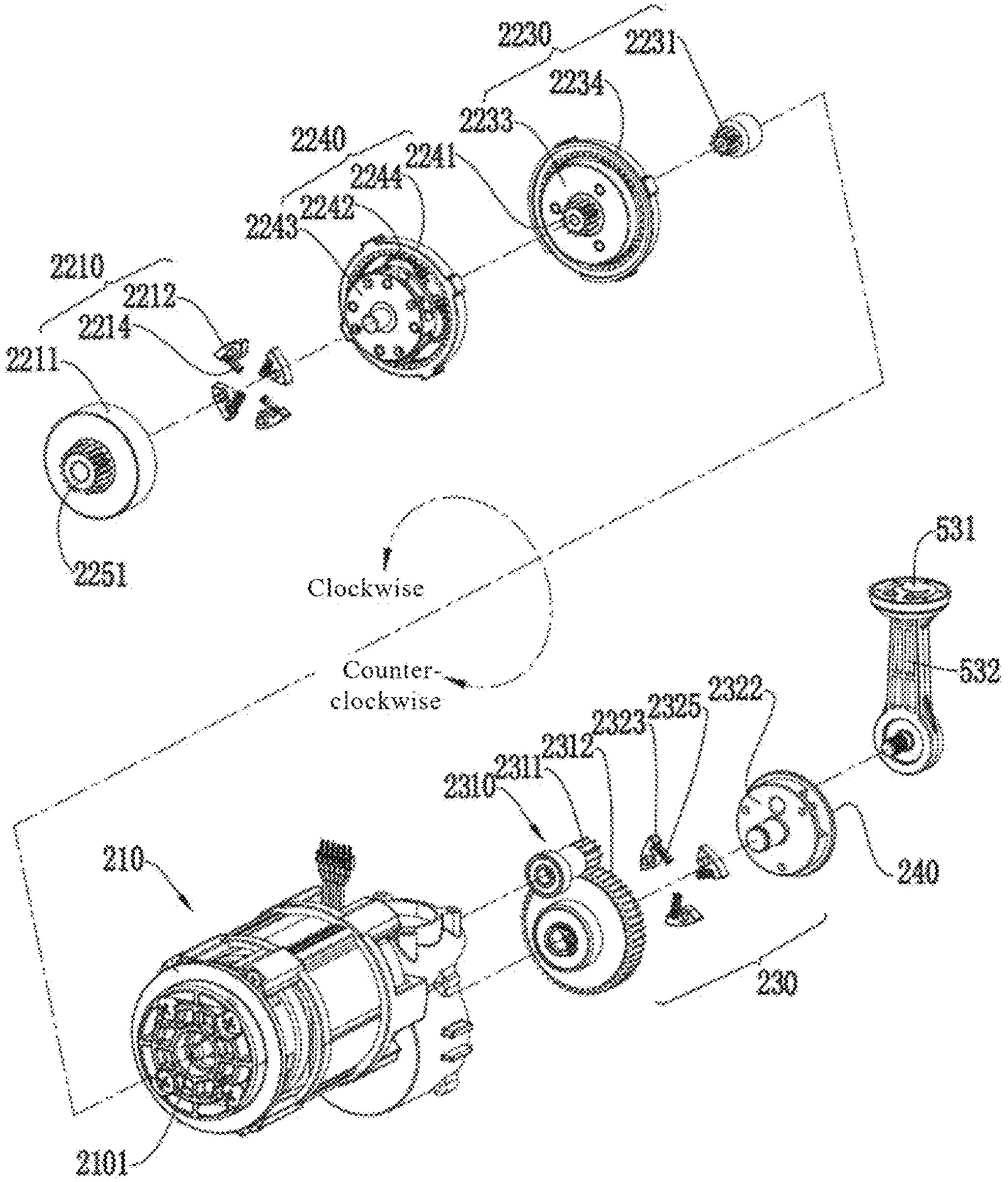
FIG. 35 is a schematic illustration of the structure of FIG. 33 from a different perspective angle.
Figure 36:
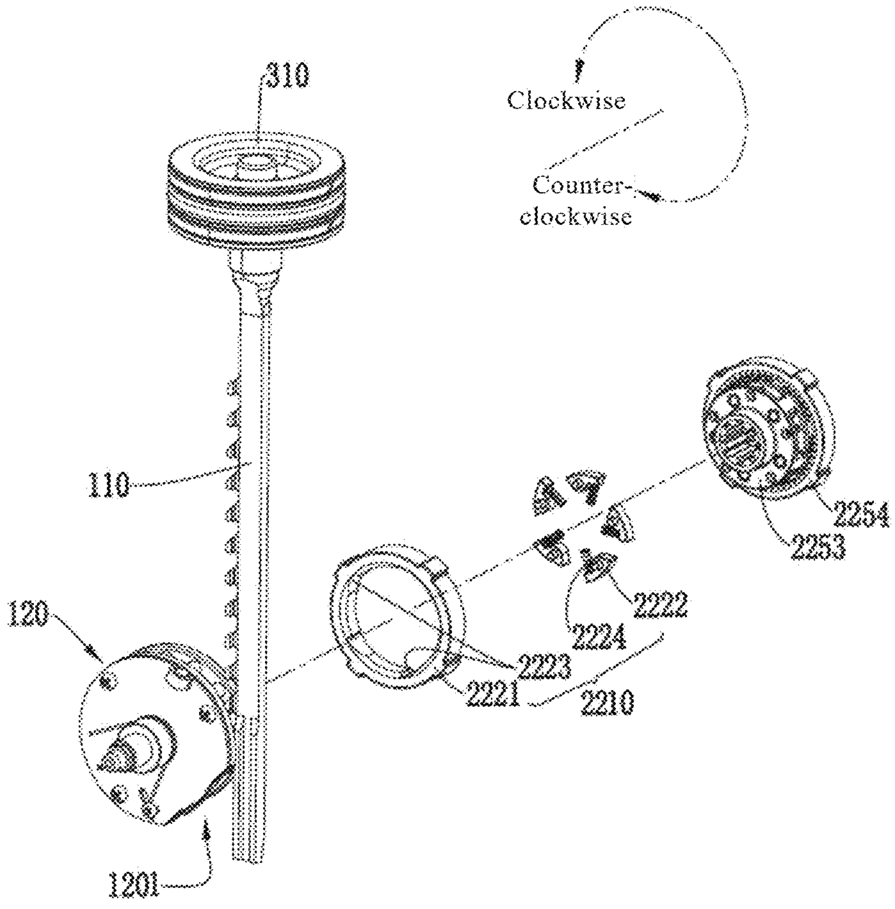
FIG. 36 is a schematic illustration of the structure of FIG. 34 from a different perspective angle.
Figure 37:
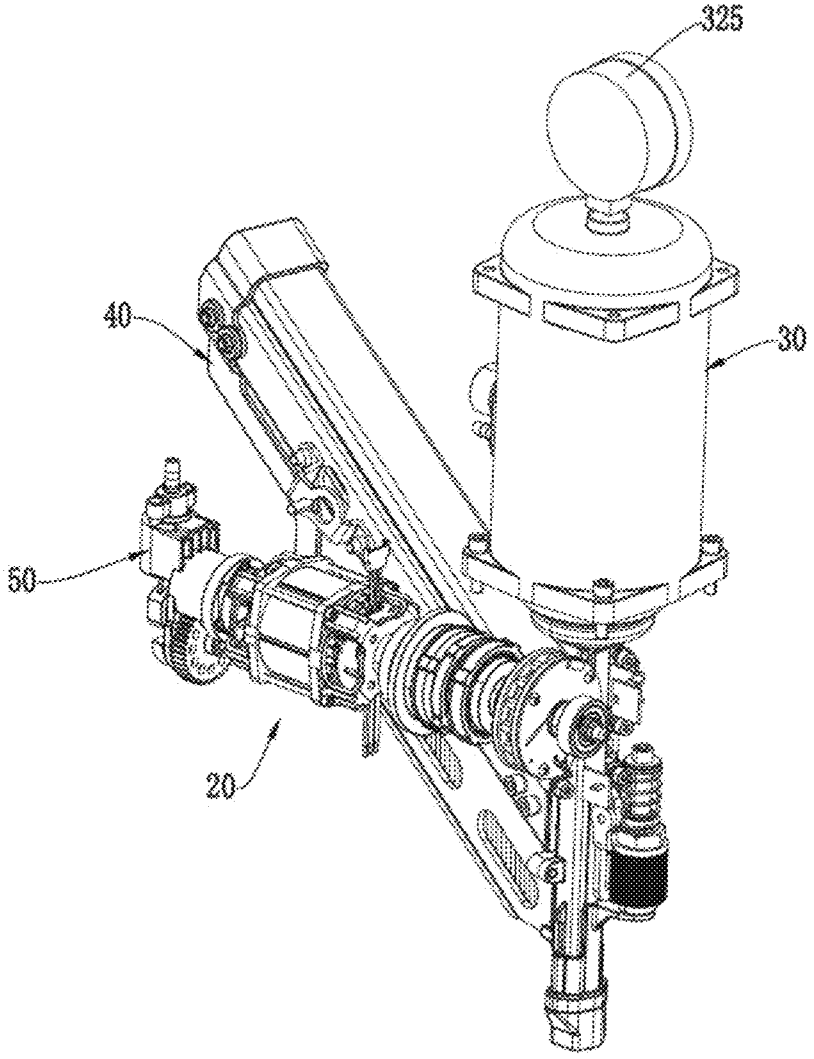
FIG. 37 is a schematic assembly view of another driving device, an air pump and a cylinder according to the present application.
Figure 38:
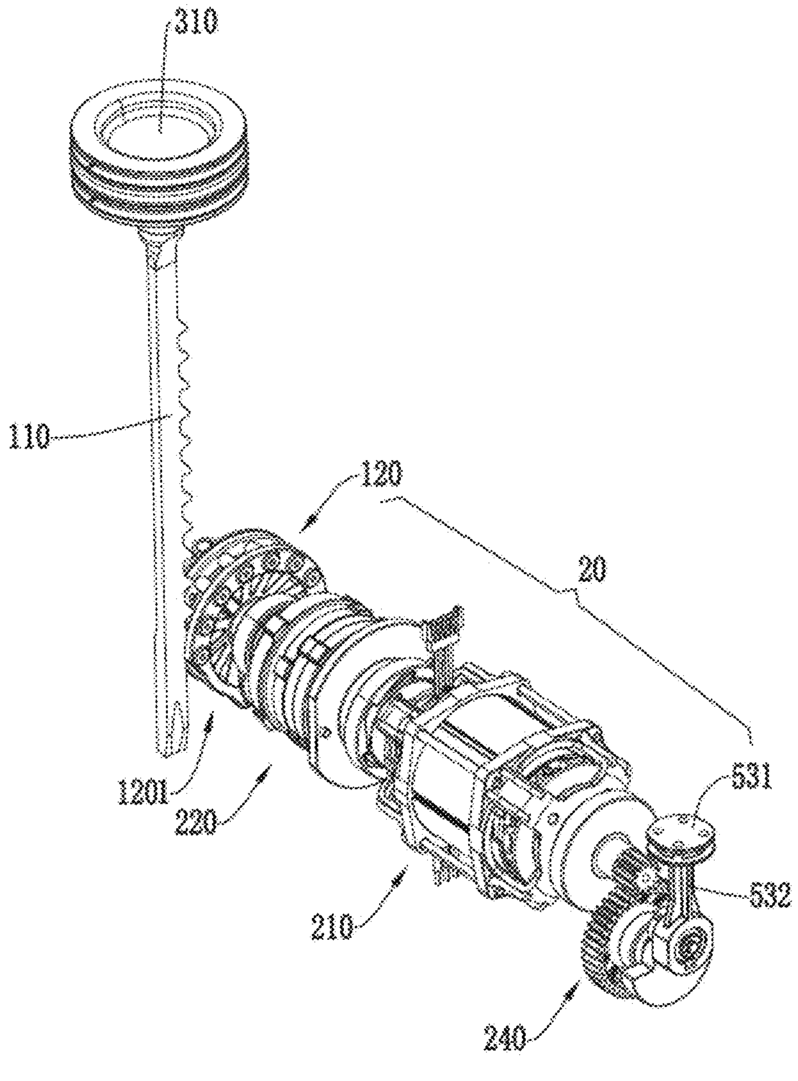
FIG. 38 schematically illustrates driving of a firing pin by the other driving device.
Figure 39:
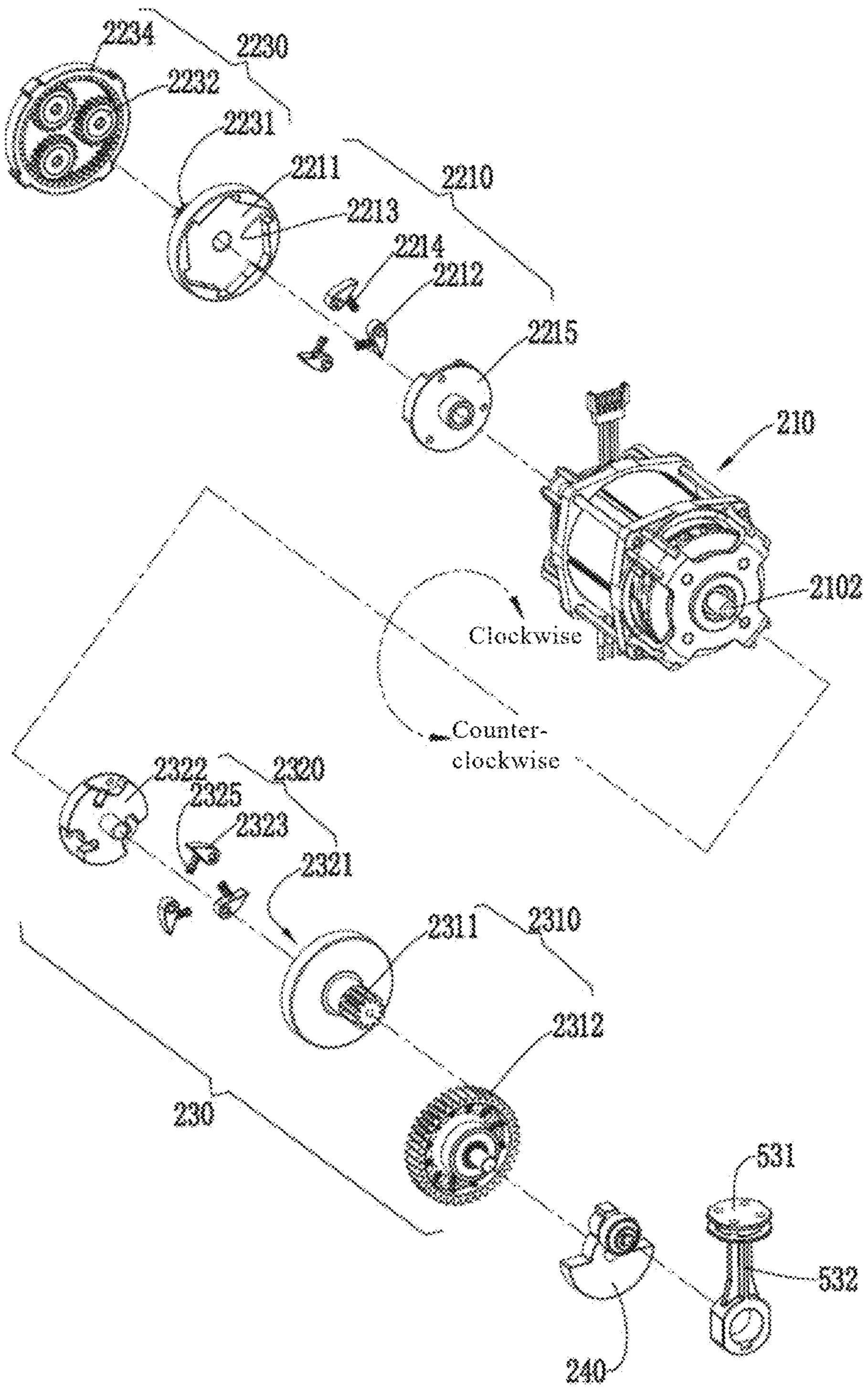
FIG. 39 is a schematic exposed view of the air pump and part of the driving device in the structure of FIG. 38.
Figure 40:
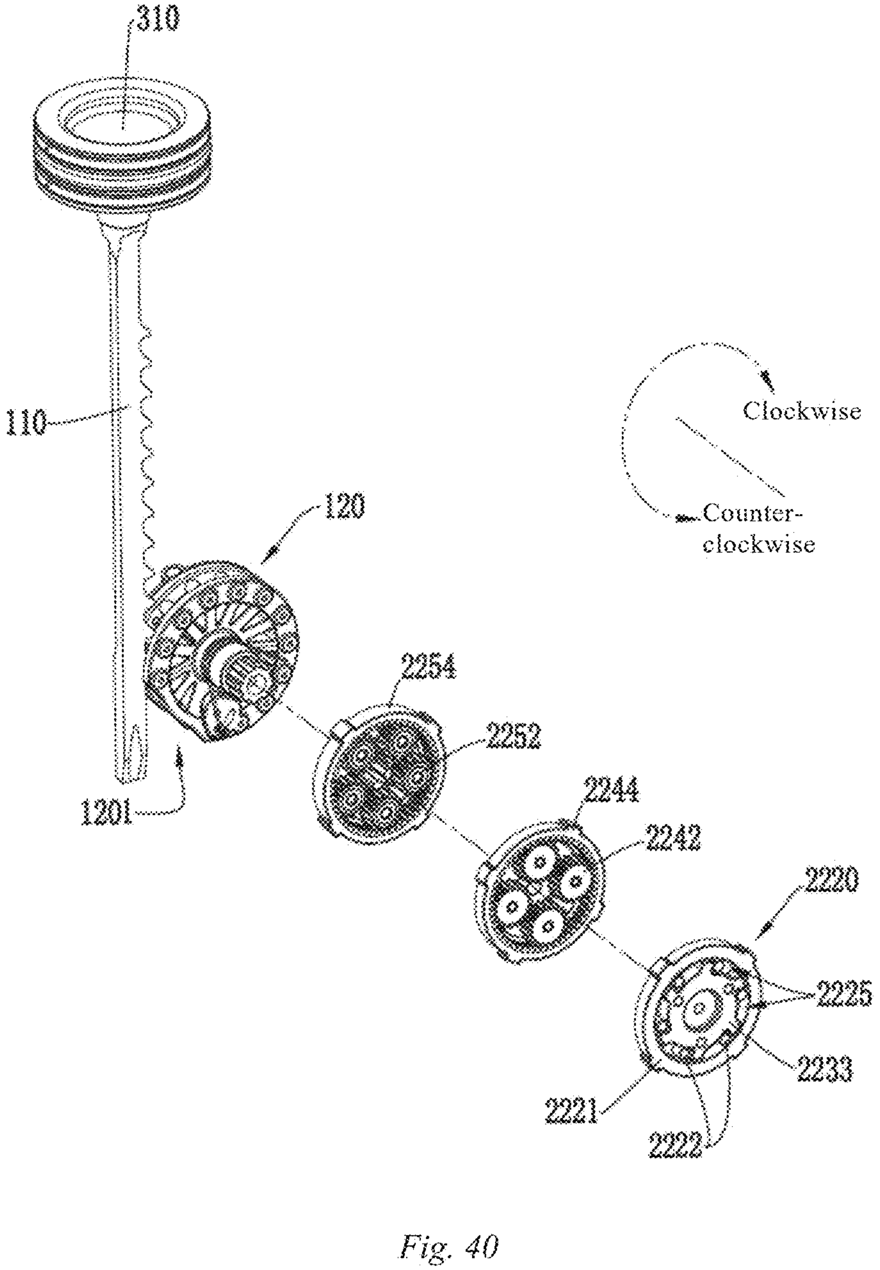
FIG. 40 is a schematic exposed view of part of the driving device in the structure of FIG. 38.
Figure 41:
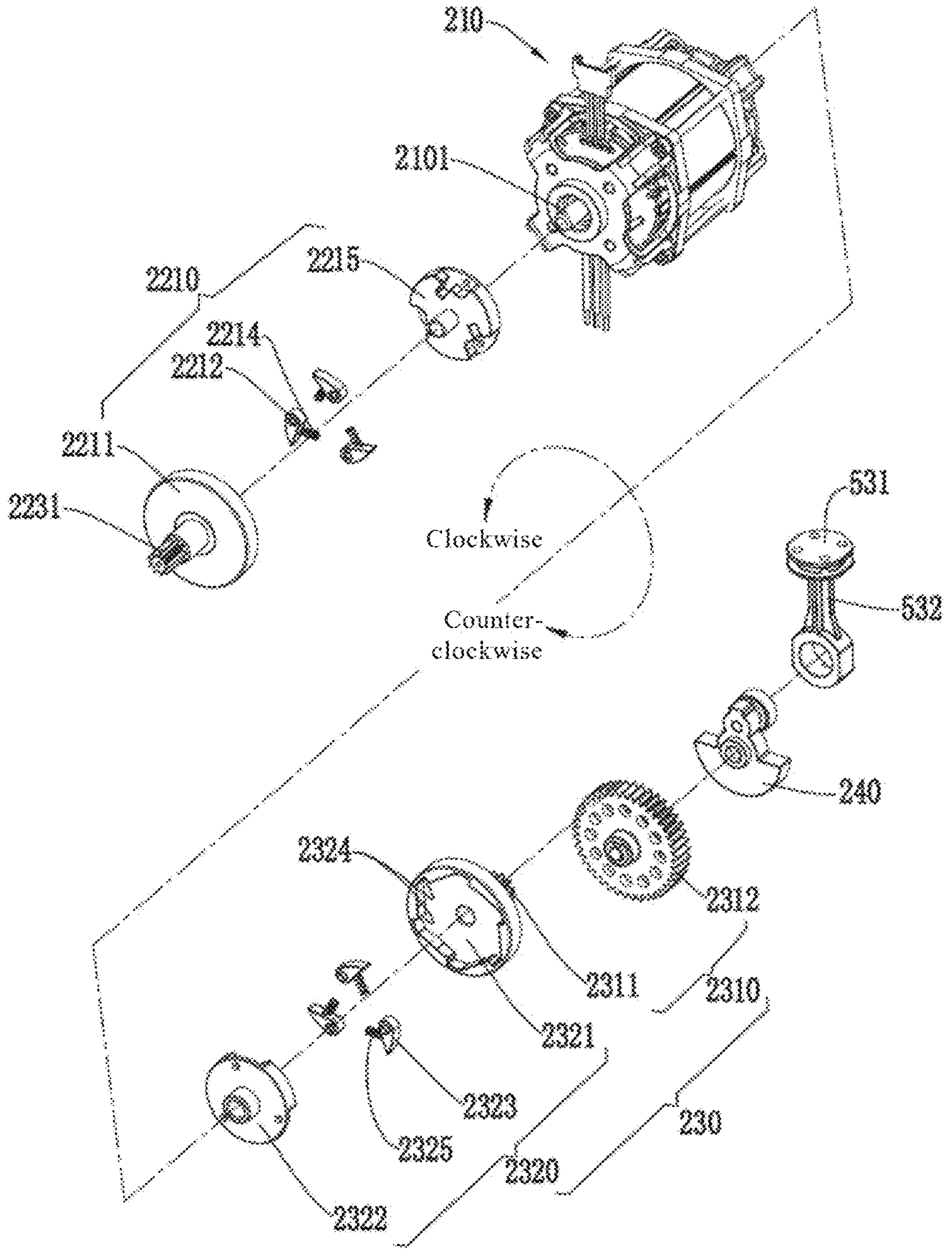
FIG. 41 is a schematic illustration of the structure of FIG. 39 from a different perspective angle.
Figure 42:
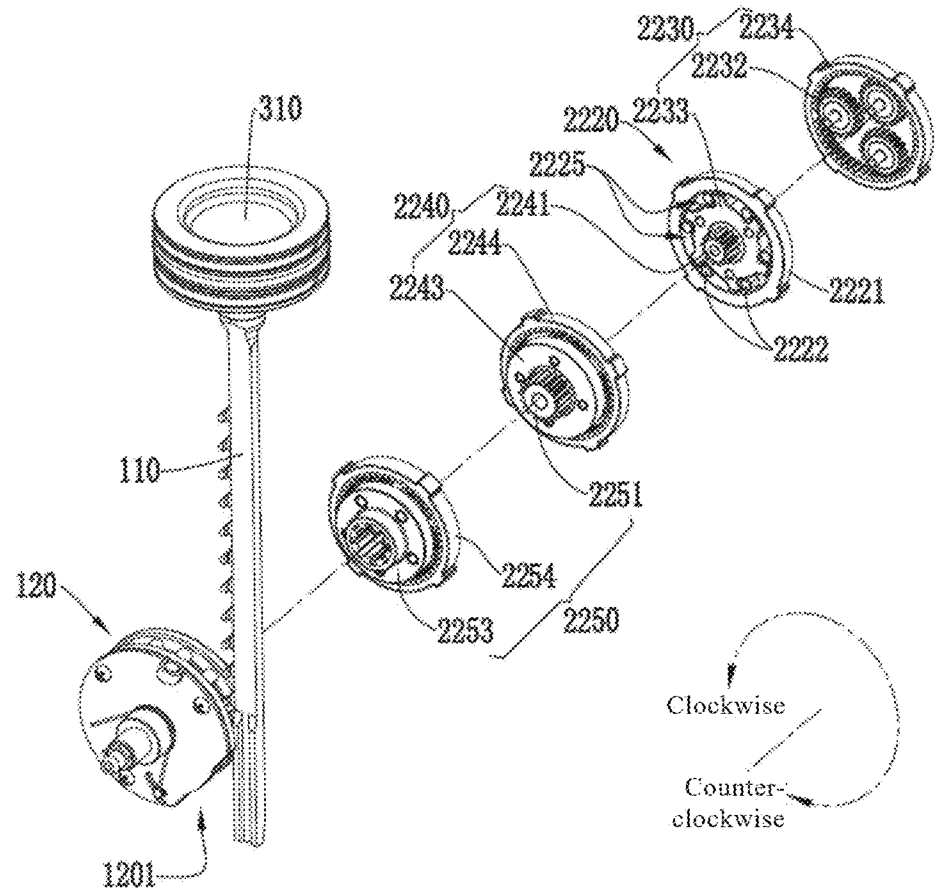
FIG. 42 is a schematic illustration of the structure of FIG. 40 from a different perspective angle.

As shown in FIGS. 31 to 33, the air pump 50 is used to fill compressed air into the sealed chamber 320 through an air hose 510, and includes a second piston 531 provided with a connecting rod 532. The connecting rod 532 is eccentrically coupled to the flywheel 240. In operation, the air pump 50 fills compressed air into the sealed chamber 320 through the air hose 510. When filled with compressed air from the air pump 50, the sealed chamber 320 provides a gas spring. The compressed air can be discharged from the sealed chamber 320 through an air exit 330, destroying the gas spring. Alternatively, the sealed chamber 320 may be provided on top of the first piston 310, and compressed gas may be permanently sealed in the sealed chamber 320, providing a gas spring.

The handle 60 can be gripped by a user to allow him/her to hold the nail gun. The power source 610 is disposed at a rear end of the handle 60, and is replaceable or rechargeable. A nailing switch 620 is provided at a downside of the handle 60.

The driving device 20 provides power to the electric nail gun. It is used to drive the flywheel 240 to rotate to cause the air pump 50 to fill air into the sealed chamber 320 of the cylinder 30 to form a gas spring. It is also used to drive the lifting wheel 120 for lifting the firing pin 110 and compressing the gas spring.

The firing pin lifting mechanism 10, the driving device 10, the cylinder 30, the air pump 50 and the handle 60 are integrated into a nailer body 70, which is embodied as an assembled housing. The nail magazine 40 is detachably attached to the nailer body 70. In particular, the handle 60 may extend right rearward from a side wall of the cylinder 30, and the driving device 20 and the nail magazine 40 may be located on left and right sides of a central plane of the handle 60 and the cylinder 30. With this arrangement, the center of mass of the nail gun, as a whole, is brought as close as possible to its geometric center, allowing a user to satisfactorily hold the nail gun in any pose as he/she desires, without feeling unbalanced in weight distribution.

The lifting wheel 120 is configured to be tangential to the firing pin 111, and they are in engagement like that of a gear and a rack. The air pump 50 is disposed at an end of the driving device 20 away from the lifting wheel 120.

The nail gun further includes a controller not shown in the figures. The controller is used to switch the motor 210 between different directions of rotation. At the beginning of use of the nail gun, the motor 210 is controlled to rotate in the second (counterclockwise) direction. Accordingly, the second output end 2102 drives the flywheel 240 to rotate to cause the air pump 50 to fill compressed air into the sealed chamber 320 to form a gas spring. After that, the motor 210 is controlled to rotate in the first (clockwise) direction. Accordingly, the first output end 2101 drives the lifting wheel 120 to lift the firing pin 110 and the first piston 310, causing the gas spring to be compressed by the first piston 310. The first direction is opposite to the second direction. Controlling the motor 210 to rotate in the first direction is accomplished by manipulating the nailing switch 620. That is, only when the nailing switch 620 is manipulated (e.g., pulled or pressed), can the motor 210 rotate in the first direction. Additionally, the lifting wheel 120 releases the firing pin 110 after it is lifted to a predetermined position, and the gas spring then instead acts on the first piston 310 to push the firing pin 110 to fire a nail.

Figure 17:
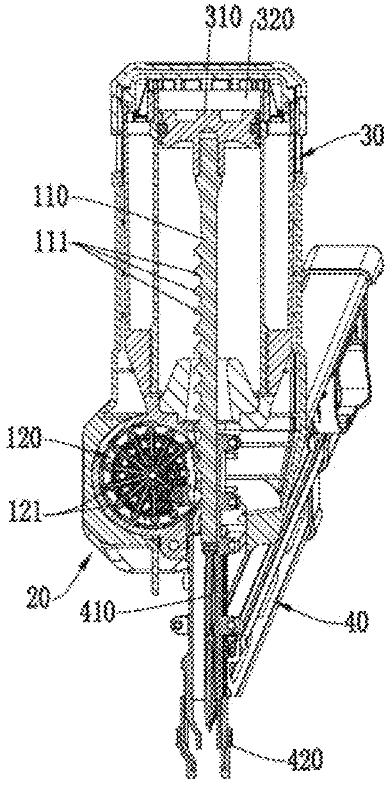
FIG. 17 is a schematic diagram showing the firing pin of FIG. 16, which has been released from the lifting wheel and will fall from the uppermost position to fire a nail.
Figure 18:
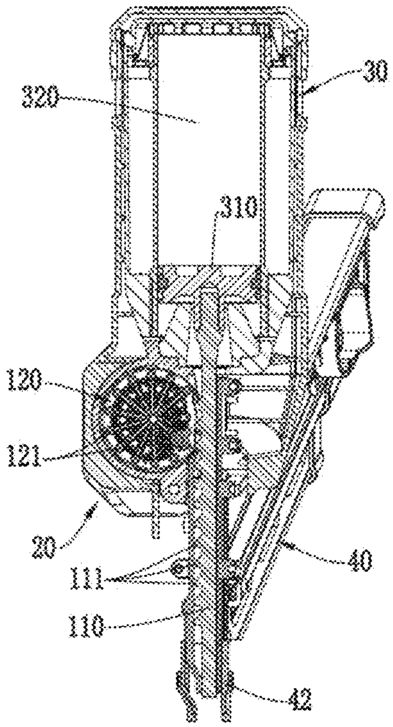
FIG. 18 is a schematic diagram showing the firing pin of FIG. 17, which has fallen to a lowest nailing position.

The lifting wheel 120 has a truncated portion 1201, and a number of lifting elements 121 are distributed across the circumference of the lifting wheel 120. The lifting elements 121 are pins assembled on the lifting wheel 120, and none of them are provided on the truncated portion. The firing pin 110 is defines a row of teeth 111 on its side surface. The number of teeth 111 corresponds to that of lifting elements 121. As the lifting wheel 121 rotates clockwise, the lifting elements 121 successively come into contact with and urge the respective teeth 111 one by one, just like the interaction between a gear and a rack in engagement therewith, thereby lifting the firing pin 110. At the same time, the first piston 310 increasingly compresses the gas spring. This process continues until the firing pin 111 is lifted to an uppermost position, as shown in FIG. 16. As the lifting wheel 120 further rotates, the truncated portion 1201 comes into contact with the firing pin 110, as shown in FIG. 17. At this time, due to absence of lifting elements 121 on the truncated portion 1201, the lifting wheel 120 comes out of engagement with the teeth 111. Consequently, the firing pin 110 is released from the lifting wheel 120 and then, under the action of the gas spring, falls along with the first piston 310 at an extremely high speed from the uppermost position to a lowermost position where it fires a nail, as shown in FIG. 18. After that, the lifting wheel 120 further rotates, and after the truncated portion 1201 moves out of contact with the firing pin 110, it again lifts the firing pin 110. Therefore, as the lifting wheel 120 rotates, the firing pin 110 reciprocates up and down to fire nails one by one.

The nail gun includes a pressure sensor for detecting a pressure in the sealed chamber 320, or a pressure in the air pump 50, which is connected to the controller. In the process of the air pump 50 filling compressed air into the sealed chamber 320, upon a preset value being reached, the controller switches the motor 210 to rotation in the first direction. The preset value is configured by the controller.

The driving device 20 uses the single motor 210 to provide power to both the lifting wheel 120 and the flywheel 240. With the aid of the first and second one-way rotation mechanisms, while the first 2101 and second 2102 output ends of the motor 210 simultaneously output torques, only one of the lifting wheel 120 and the flywheel 240 is driven, while the other is disengaged from being driven. That is, when the lifting wheel 120 is being driven, the flywheel 240 is not driven; and when the flywheel 240 is being driven, the lifting wheel 120 is not driven.

Accordingly, as shown in FIGS. 31 to 36, a driving device 20 includes a motor 210, the lifting wheel 120, a first transmission means 220, the flywheel 240 and a second transmission means 230.

The motor 210 has a first output end 2101 and a second output end 2102, which rotate in the same direction. The connecting rod 532 is eccentrically coupled to the flywheel 240, and the flywheel 240 rotates to drive the air pump 50 to fill air into the sealed chamber 320. The present invention is not limited to any particular direction in which the flywheel 240 and the second output end 2102 rotate to drive the air pump 50.

As discussed above, the lifting wheel 120 is used to lift the firing pin 110 and compress the gas spring.

The first transmission means 220 is arranged between the first output end 2101 of the motor 210 and the lifting wheel 120 and includes a first one-way rotation mechanism. When rotating in one direction, the first output end 2101 drives the lifting wheel 120 by means of the first transmission means 220. When the first output end 2101 rotates in the other direction, the first one-way rotation mechanism disengages the first output end 2101 from driving the lifting wheel 120.

As discussed above, the flywheel 240 is used to drive the air pump 50.

The second transmission means 230 is arranged between the second output end 2102 of the motor 210 and the flywheel 240 and includes a second one-way rotation mechanism. When rotating in one direction, the second output end 2102 drives the flywheel 240 by means of the second transmission means 230. When the second output end 2102 rotates in the other direction, the second one-way rotation mechanism disengages the second output end 2102 from driving the flywheel 240.

The first and second one-way rotation mechanisms are configured so that, as the first 2101 and second 2102 output ends of the motor 210 simultaneously output torques, one of the lifting wheel 120 and the flywheel 240 is driven, while the other is not driven.

The first transmission means 220 includes a first speed-reducing mechanism. The lifting wheel 120, the first speed-reducing mechanism and the first one-way rotation mechanism are coaxially disposed with the first output end 2101.

The first speed-reducing mechanism consists of planetary gear mechanisms with coaxial input and output ends, which are a first planetary gear mechanism 2230, a second planetary gear mechanism 2240 and a third planetary gear mechanism 2250.

The first one-way rotation mechanism consists of ratchet-pawl mechanisms, which are a first ratchet-pawl mechanism 2210 and a second ratchet-pawl mechanism 2220. The first ratchet-pawl mechanism 2210 is proximal to the first output end 2101, and the second ratchet-pawl mechanism 2220 is proximal to the lifting wheel 120. The first ratchet-pawl mechanism 2210 is configured to, when the first output end 2101 rotates in one direction, come into engagement to enable the first output end 2101 to drive the lifting wheel 120. It is also configured to, when the first output end 2101 rotates in other direction, rotate idly to disengage the first output end 2101 from driving the lifting wheel 120. The second ratchet-pawl mechanism 2210 is configured to rotate idly when the first output end 2101 is driving the lifting wheel 120 by means of the first transmission means 220. It is also configured to, when the lifting wheel 120 tends to rotate in the opposite direction, come into engagement to block the lifting wheel 120 from rotating in the opposite direction. With this arrangement, the lifting wheel 120 and the flywheel 240 are rotated in different periods of time, but not simultaneously, to accomplish air filling and nailing, respectively.

Specifically, in the first transmission means 220, the first planetary gear mechanism 2230, the second planetary gear mechanism 2240, the first ratchet-pawl mechanism 2210 and the third planetary gear mechanism 2250 successively transmit power from the first output end 2101 to the lifting wheel 120. The first ratchet-pawl mechanism 2210 is provided at the output end of the second planetary gear mechanism 2240, and the second ratchet-pawl mechanism 2220 is provided at the output end of the third planetary gear mechanism 2250.

The first planetary gear mechanism 2230 includes a first input gear 2231, first planet gears 2232, a first output member 2233 and a first ring gear 2234. The first ring gear 2234 is secured to a drum disposed external thereto. The first planet gears 2232 are swingably pinned to the first output member 2233 so as to be in engagement with the first input gear 2231 and the first ring gear 2234. The first output member 2233 provides a planetary carrier for the first planet gears 2232. The first input gear 2231 is keyed to the first output end 2101 in a manner capable of transmitting power. With this arrangement, rotation of the first output end 2101 can be converted to rotation of the first output member 2233 in the same direction at a reduced speed.

The second planetary gear mechanism 2240 includes a second input gear 2241, second planet gears 2242, a second output member 2243 and a second ring gear 2244. The second ring gear 2244 is secured to the drum disposed external thereto. The second planet gears 2242 are swingably pinned to the second output member 2243 so as to be in engagement with the second input gear 2241 and the second ring gear 2244. The second output member 2243 provides a planetary carrier for the second planet gears 2242. The second input gear 2241 is integrally formed with the first output member 2233. With this arrangement, rotation of the first output member 2233 can be converted to rotation of the second output member 2243 in the same direction at a reduced speed.

The first ratchet-pawl mechanism 2210 includes a first ratchet sleeve 2211 and first pawls 2212. The first ratchet sleeve 2211 is rotatable and provided with first one-way teeth 2213 on its inner wall surface. The first pawls 2212 are pinned to the second output member 2243 and biased by first springs 2214 against the inner wall surface of the first ratchet sleeve 2211. Depending on a direction defined by the first one-way teeth 2213, when the second output member 2243 rotates in the first (clockwise) direction, the first pawls 2212 are in abutment and engagement with the first one-way teeth 2213 and rotates the first ratchet sleeve 2211 in the first (clockwise) direction. When the second output member 2243 rotates in the second (counterclockwise) direction, the first pawls 2212 slide over the inner wall surface of the first ratchet sleeve 2211, and the first ratchet-pawl mechanism 2210 rotates idly. As a result, the first ratchet sleeve 2211 remains stationary without transmitting the rotation.

The third planetary gear mechanism 2250 includes a third input gear 2251, third planet gears 2252, a third output member 2253 and a third ring gear 2254. The third ring gear 2254 is secured to the drum disposed external thereto. The third planet gears 2252 are swingably pinned to the third output member 2253 so as to be in engagement with the third input gear 2251 and the third ring gear 2254. The third output member 2253 provides a planetary carrier for the third planet gears 2252. The third input gear 2251 is integrally formed with the first ratchet sleeve 2211. The third output member 2253 is in driving engagement with the lifting wheel 120 through a spline. With this arrangement, rotation of the first ratchet sleeve 2211 in the first (clockwise) direction can be converted to rotation of the third output member 2253 in the same direction at a reduced speed, enabling the third output member 2253 to rotate the lifting wheel 120 in the first (clockwise) direction.

The second ratchet-pawl mechanism 2220 includes a second ratchet sleeve 2221 and second pawls 2222. The second ratchet sleeve 2221 is secured to the drum disposed external thereto. The second ratchet sleeve 2221 is provided with second one-way teeth 2223 on its inner wall surface. The second pawls 2222 are pinned to the third output member 2253 and biased by second springs 2224 against the inner wall surface of the second ratchet sleeve 2221. Depending on a direction defined by the second one-way teeth 2223, when the third output member 2253 rotates in the first (clockwise) direction, the second pawls 2222 slide over the inner wall surface of the second ratchet sleeve 2221, and the second ratchet-pawl mechanism 2220 rotates idly. Thus, the third output member 2253 is allowed to rotate the lifting wheel 120 to lift the firing pin 110. When the motor 210 stops operating, the firing pin 110 is lifted to the uppermost position, as described above. At this point, under the action of the gas spring, the firing pin 110 tends to move downward and causes the lifting wheel 120 to tend to rotate in the second (counterclockwise) direction. This tendency to rotate is transferred to the third output member 2253, bringing the second pawls 2222 into abutment and engagement with the second one-way teeth 2223. As a result, such rotation is blocked, preventing the firing pin 110 from falling and maintaining it at the uppermost position.

The second transmission means 230 includes a second speed-reducing mechanism. The central axis of the flywheel 240 is located below a central axis of the second output end 2102, and the air pump 50 is arranged above the flywheel 240. The second speed-reducing mechanism is an off-axis gear transmission mechanism, and the second one-way rotation mechanism is a ratchet-pawl mechanism. Specifically, the second transmission means 230 includes an off-axis gear transmission mechanism 2310 and a third ratchet-pawl mechanism 2320, which successively transmit power from the second output end 2102 to the flywheel 240. The third ratchet-pawl mechanism 2320 is configured so that the second output end 2102, when rotating in one direction, drives the flywheel 240 through the second transmission means 230, and so as to disengage the second output end 2102 from driving the flywheel 240 when the second output end 2102 rotates in the first direction.

The off-axis gear transmission mechanism 2310 includes a driving gear 2311 and a driven gear 2312, which are in engagement with each other. The driving gear 2311 is keyed to the second output end 2102, and the driven gear 2312 is disposed below the driving gear 2311.

The third ratchet-pawl mechanism 2320 includes a third ratchet sleeve 2321, a third rotating body 2322 and third pawls 2323. The third ratchet sleeve 2321 is integrally formed with a rear end of the driven gear 2312. The third ratchet sleeve 2321 is provided with third one-way teeth 2324 on its inner wall surface. The third rotating body 2322 is provided at a front end of the flywheel 240. The third pawls 2323 are swingably pinned to the third rotating body 2322 and biased by third springs 2325 against the inner wall surface of the third ratchet sleeve 2321. Depending on a direction defined by the third one-way teeth 2324, when the second output end 2102 and the first output end 2101 rotate together in the first (clockwise) direction, the driven gear 2311 rotates counterclockwise, and the third pawls 2323 slide over the inner wall surface of the third ratchet sleeve 2321, causing idle rotation of the third ratchet-pawl mechanism 2320. Consequently, the second output end 2102 does not drive the flywheel 240, and the air pump 50 does not work. On the contrary, when the second output end 2102 and the first output end 2101 together rotate in the second (counterclockwise) direction, the driven gear 2312 rotates clockwise, and the third one-way teeth 2324 on the inner wall surface of the third ratchet sleeve 2321 urges the third pawls 2323 to pivot counterclockwise. Consequently, the third ratchet-pawl mechanism 2320 is in an engaged configuration, in which the third rotating body 2322 rotates together with the flywheel 240, and the second output end 2102 drives the flywheel 240, bringing the air pump 50 into operation.

FIGS. 37 to 42 show another driving device 20, which functions in the same way as, but structurally differs from, that of FIGS. 32 to 36. The first difference is that motor rotation is reversed in a different way. The first difference is that gas spring pressure control is accomplished in a different way. The third difference is that it is structured in a different way. Only these differences will be further described below, and structural features common to these devices are not repeated.

First, in the driving device 20 of FIGS. 37 to 42, the nailer body is configured with a switch for controlling the motor 210 to operate by rotating in the first or second direction, in place of the automatic control provided by the controller in the driving device 20 of FIGS. 32 to 36.

Second, an associated nail gun includes a pressure gauge 325 for detecting a pressure in the sealed chamber 320, or in the air pump 50. This allows easy pressure monitoring in the process of filling air into the sealed chamber 320 and during use.

Third, the driving device 20 of FIGS. 37 to 42 includes a first transmission means 220 and a second transmission means 220, which differ from those in the driving device 20 of FIGS. 32 to 36.

The first transmission means 220 includes a first ratchet-pawl mechanism 2210, a first planetary gear mechanism 2230, a second planetary gear mechanism 2240 and a third planetary gear mechanism 2250, which successively transmit power from the first output end 2101 to the lifting wheel 120, and the second ratchet-pawl mechanism 2220 is provided at an output end of the first planetary gear mechanism 2230.

The first ratchet-pawl mechanism 2210 includes a first ratchet sleeve 2211, a first rotating body 2215 and first pawls 2212. The first ratchet sleeve 2211 is rotatable and provided with first one-way teeth 2213 on its inner wall surface. The first rotating body 2215 is keyed to the first output end 2101, and the first pawls 2212 are pinned to the first rotating body 2215 and biased by first springs 2214 against the inner wall surface of the first ratchet sleeve 2211. Depending on a direction defined by the first one-way teeth 2213, when the first output end 2101 rotates in the first (clockwise) direction, the first rotating body 2215 rotates therewith, bringing the first pawls 2212 into abutment and engagement with the first one-way teeth 2213. As such, the first pawls 2212 urge the first ratchet sleeve 2211 to rotate in the first (clockwise) direction. When the first output end 2101 rotates in the second (counterclockwise) direction, the first rotating body 2215 rotates therewith, while the first pawls 2212 slide over the inner wall surface of the first ratchet sleeve 2211. Consequently, the first ratchet-pawl mechanism 2210 rotates idly, and the first ratchet sleeve 2211 remains stationary without transmitting the rotation.

The first planetary gear mechanism 2230 includes a first input gear 2231, first planet gears 2232, a first output member 2233 and a first ring gear 2234. The first input gear 2231 is integrally formed with the first ratchet sleeve 2211, and the first ring gear 2234 is secured to a drum disposed external thereto. The first planet gears 2232 are pinned to the first output member 2233 so as to be in engagement with the first input gear 2231 and the first ring gear 2234. The first output member 2233 provides a planetary carrier for the first planet gears 2232. With this arrangement, rotation of the first input gear 2231 along with the first ratchet sleeve 2211 can be converted to rotation of the first output member 2233 in the same direction at a reduced speed.

The second planetary gear mechanism 2240 includes a second input gear 2241, second planet gears 2242, a second output member 2243 and a second ring gear 2244. The second input gear 2241 is integrally formed with the first output member 2233, and the second ring gear 2244 is secured to the drum disposed external thereto. The second planet gears 2242 are pinned to the second output member 2243 so as to be in engagement with the second input gear 2241 and the second ring gear 2244. The second output member 2243 provides a planetary carrier for the second planet gears 2242. With this arrangement, rotation of the second input gear 2241 along with the first output member 2233 can be converted to rotation of the second output member 2243 in the same direction at a reduced speed.

Figure 43:
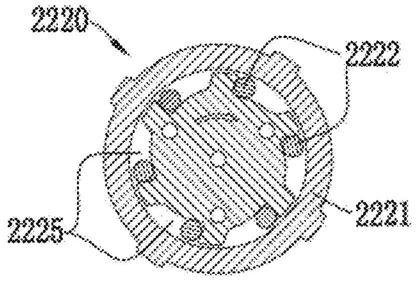
FIG. 43 is a schematic cross-sectional view of a second ratchet-pawl mechanism which is being engaged.
Figure 44:
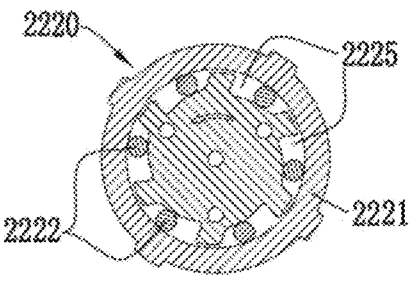
FIG. 44 is a schematic cross-sectional view of the second ratchet-pawl mechanism which is rotating idly.
Figure 45:
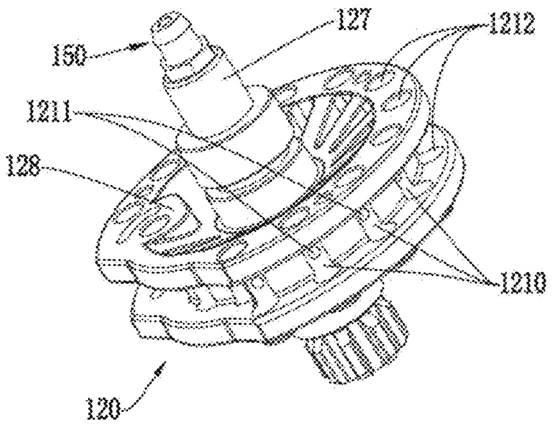
FIG. 45 is a schematic illustration of a grease nipple provided on a lifting wheel.
Figure 46:
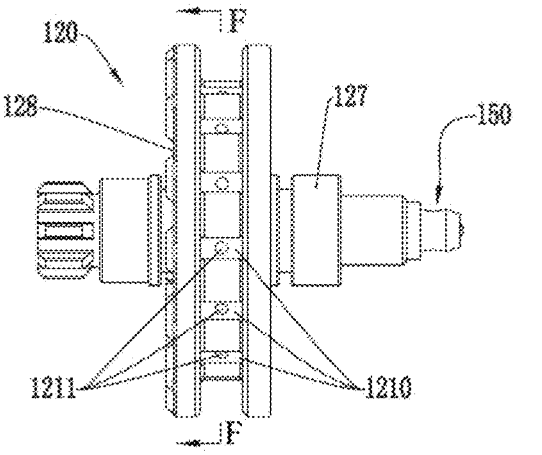
FIG. 46 schematically illustrates an orthographic projection of the structure of FIG. 31 from a perspective angle.

The second ratchet-pawl mechanism 2220 includes a second ratchet sleeve 2221 and second pawls 2222. The second ratchet sleeve 2221 is secured to the drum disposed external thereto. The second output member 2243 extends into the second ratchet sleeve 2221, with first gaps 2225 being left between it and an inner wall surface of the second ratchet sleeve 2221, each gradually broadening in one direction and gradually narrowing in the other direction. The second pawls 2222 are in the shape of rollers and received in the first gaps 2225. As shown in FIG. 43, when the second output member 2243 rotates relative to the second ratchet sleeve 2221 in the direction in which the first gaps 2225 gradually narrow (the first/clockwise direction), the second pawls 2222 are freely received in the first gaps 2225 at the broader ends thereof, allowing the second output member 2243 to rotate in this direction. As shown in FIG. 44, when the second output member 2243 rotates relative to the second ratchet sleeve 2221 in the direction in which the first gaps 2225 gradually broaden (the second/counterclockwise direction), the second pawls 2222 are squeezed and engaged between the second output member 2243 and the inner wall surface of the second ratchet sleeve 2221, blocking the second output member 2243 from rotating in this direction. When the motor 210 stops operating, the firing pin 110 is lifted to the uppermost position, as described above. At this point, under the action of the gas spring, the firing pin 110 tends to move downward and causes the lifting wheel 120 to tend to rotate in the second (counterclockwise) direction. This tendency to rotate is transferred to the second output member 2243, bringing the second ratchet-pawl mechanism 2220 into the configuration shown in FIG. 44, in which it blocks such rotation. As a result, the firing pin 110 is prevented from falling and maintained at the uppermost position.

The third planetary gear mechanism 2250 includes a third input gear 2251, third planet gears 2252, a third output member 2253 and a third ring gear 2254. The third input gear 2251 is integrally formed with the second output member 2243, and the third ring gear 2254 is secured to the drum disposed external thereto. The third planet gears 2252 are pinned to the third output member 2253 so as to be in engagement with the third input gear 2251 and the third ring gear 2254. The third output member 2253 provides a planetary carrier for the third planet gears 2252. The third output member 2253 is in driving engagement with the lifting wheel 120 through a spline. With this arrangement, rotation of the third input gear 2251 along with the second output member 2243 in the first (clockwise) direction can be converted to rotation of the third output member 2253 in the same direction at a reduced speed, enabling the third output member 2253 to rotate the lifting wheel 120 in the first (clockwise) direction to lift the firing pin 110.

The second transmission means 230 includes a third ratchet-pawl mechanism 2320 and an off-axis gear transmission mechanism 2310, which successively transmit power from the second output end 2102 to the flywheel 240. The third ratchet-pawl mechanism 2320 is configured so that the second output end 2102, when rotating in one direction, drives the flywheel 240 through the second transmission means 230, and so as to disengage the second output end 2102 from driving the flywheel 240 when the second output end 2102 rotates in the other direction.

The third ratchet-pawl mechanism 2320 includes a third rotating body 2322, third pawls 2323 and a third ratchet sleeve 2321. The third rotating body 2322 is keyed to the second output end 2102, and the third ratchet sleeve 2321 is rotatable and provided with third one-way teeth 2324 on its inner wall surface. The third pawls 2323 are swingably pinned to the third rotating body 2322 and biased by third springs 2325 against the inner wall surface of the third ratchet sleeve 2321. Depending on a direction defined by the third one-way teeth 2324, when the second output end 2102 and the first output end 2101 rotate together in the first (clockwise) direction, the third rotating body 2322 rotates along with the second output end 2102, while the third pawls 2323 slide over the inner wall surface of the third ratchet sleeve 2321. Consequently, the third ratchet sleeve 2321 remains stationary and does not rotate, and the third ratchet-pawl mechanism 2320 rotates idly. On the contrary, when the second output end 2102 and the first output end 2101 together rotate in the second (counterclockwise) direction, the third pawls 2323 are brought into abutment and engagement with the third one-way teeth 2324 and urge the third ratchet sleeve 2321 to rotate in the second (counterclockwise) direction.

The off-axis gear transmission mechanism 2310 includes a driving gear 2311 and a driven gear 2312, which are in engagement with each other. The driving gear 2311 is integrally formed with the third ratchet sleeve 2321, and the driven gear 2312 is disposed below the driving gear 2311. The flywheel 240 is disposed coaxially with the driven gear 2312. With this arrangement, when the second output end 2102 and the first output end 2101 together rotate in the first (clockwise) direction, the second output end 2102 does not actuate the flywheel 240, and the air pump 50 does not work. When the second output end 2102 and the first output end 2101 together rotate in the second (counterclockwise) direction, the driving gear 2311 rotates along with the third ratchet sleeve 2321, and the driven gear 2312 in turn rotates along with the driving gear 2311. As a result, the flywheel 240 is also rotated, causing the air pump 50 to fill air into the sealed chamber 320.

In each of the nail guns discussed above, depending on the arrangement of the first transmission means 220 and the second transmission means 230, when the first output end 2101 and the second output end 2102 of the motor 210 rotate in the first (clockwise) direction, the first output end 2101 drives rotation of the lifting wheel 120 through the first transmission means 220, which lifts the firing pin 110. Meanwhile, the second transmission means 2102 disengages the second output end 2102 from driving the flywheel 240, leaving the air pump 50 out of operation. When the first output end 2101 and the second output end 2102 of the motor 210 rotate in the second (counterclockwise) direction, the second output end 2102 actuates rotation of the drive flywheel 240 through the second transmission means 230, which causes the air pump 50 to operate. At the same time, the first transmission means 220 disengages the first output end 2101 from driving the lifting wheel 120, disallowing lifting of the firing pin 110. In this way, the single motor 210 accomplishes the independent functions of driving the lifting wheel 120 and lifting the flywheel 240.

In order to use such a nail gun, the motor 210 is first rotated counterclockwise, causing the air pump 50 to fill air into the sealed chamber 320. The motor 210 is then switched to rotation in the clockwise direction, and the nailing switch 620 is activated to allow the motor 210 to fire nails.

The rotation direction switching and control of the motor 210 may be accomplished either automatically by a controller, or manually by manipulating, for example, a button or knob provided on the nailer body. When the nail gun is out of use, compressed air is discharged from the sealed chamber 320 through the air exit 330.

Power transmission provided by the first 220 and second 230 transmission means has been described in detail above. However, in practical implementations, it is also necessary to support the rotating components therein with bearings. In order to keep the pawls and planet gears in place, a stop plate may be provided to cover and confine them in place. Further, a rotary sleeve may be provided between each adjacent pair of ratchet-pawl mechanism and planetary gear mechanism that can rotate relative to each other to impart increased resistance to tear and wear.

In one embodiment, as shown in FIGS. 18 to 24, a firing pin lifting mechanism 10 includes a firing pin 110, a lifting wheel 120, a movable member 130 and a resilient member 140.

The firing pin 110 defines a row of teeth 111 in its lengthwise direction. Here, the lengthwise direction refers to a direction in which the firing pin 110 moves out of and into the page of FIGS. 18 to 24.

The lifting wheel 120 includes a first portion and a second portion. The first portion is provided with lifting elements 121, but the second portion is not. The first portion corresponds to a circumferential sector spanning a first angular range α, and the second portion corresponds to a circumferential sector spanning a second angular range β. When the lifting wheel 120 rotates to bring the first angular range α into alignment with the teeth 111, the lifting elements 121 are configured to be able to engage the teeth 111 to lift the firing pin 110. Additionally, when the lifting wheel 120 rotates to bring the second angular range β into alignment with the teeth 111, the lifting elements 121 are configured to be able to disengage from the teeth 111, releasing the firing pin 110.

The movable member 130 is assembled on the lifting wheel 120 and configured to, as the lifting wheel 120 rotates, be able to move from a first position to a second position to cause an adjustment in engagement of the lifting elements 121 with the teeth 111.

The resilient member is configured to be able to urge the movable member 130 from the second position into the first position.

Further, the movable member 130 is arranged on the lifting wheel 120 at a starting point of the first angular range α, which corresponds to a point of the first angular range α where the lifting elements 121 come into engagement with the teeth 111 and start lifting the firing pin 110, during rotation of the lifting wheel 120. The movable member 130 has a force-receiving portion 131 and an engagement portion 132.

The force-receiving portion 131 and the engagement portion 132 are configured as described below.

When the movable member 130 is in the first position, the force-receiving portion 131 is in a blocked position, and the engagement portion 132 is away from an engaged position.

As the movable member 130 rotates with the lifting wheel 120, the force-receiving portion 131 is blocked by the teeth 111 and overcomes a biasing force of the resilient member, allowing the movable member 130 to move from the first position to the second position.

When the movable member 130 is in the second position, the force-receiving portion 131 is away from the blocked position, and the engagement portion 132 is in the engaged position, where it is in the same sequence as the lifting elements 121 for engaging the teeth 111.

Adjacent teeth 111 on the firing pin 110 are spaced at a constant tooth pitch S, and adjacent lifting elements 121 on the lifting wheel 120 are also spaced at a constant pitch δ. When the engagement portion 132 is in the engaged position, where it is in the same sequence as the lifting elements 121 for engaging the teeth 111, an angular distance θ between the engagement portion 132 and an adjacent lifting element 121 is equal to the pitch δ between adjacent lifting elements 121.

Two spaced walls 122 define a second gap 123 therebetween. Opposite ends of the lifting elements 121 are assembled to the two spaced walls 122, with their middle portions being received in the second gap 123.

The movable member 130 is pivotally assembled in the second gap 123 by a pin 133.

As shown in FIGS. 45 to 48, the lifting wheel 120 includes a rotating shaft 127 and a wheel body 128 rotating together with the rotating shaft 127. A grease nipple 150 is provided on the wheel body 128, and grease channels 129 are provided within the wheel body 128, which extend from the grease nipple 150 to the lifting elements 121.

In the wheel body 128 is also provided a grease channel 129 extending from the grease nipple 150 to the movable member 130.

In one embodiment, as shown in FIGS. 18 to 24, a firing pin lifting mechanism 10 includes a firing pin 110, a lifting wheel 120, a movable member 130 and a resilient member.

The firing pin 110 defines a number of teeth 111 arranged in a row in its lengthwise direction.

Figure 19:
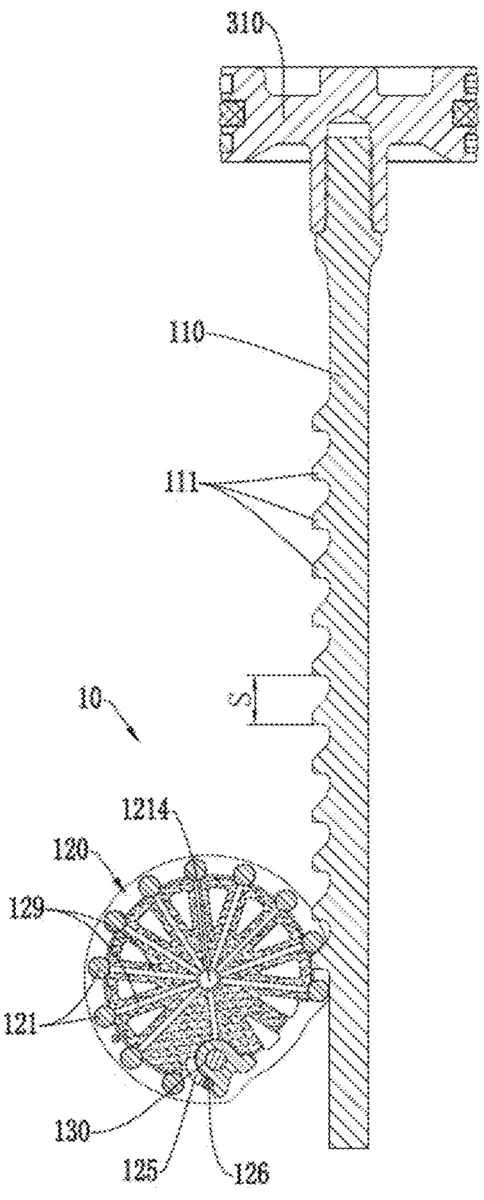
FIG. 19 is an enlarged view of the lifting wheel and the firing pin of FIG. 16.
Figure 20:
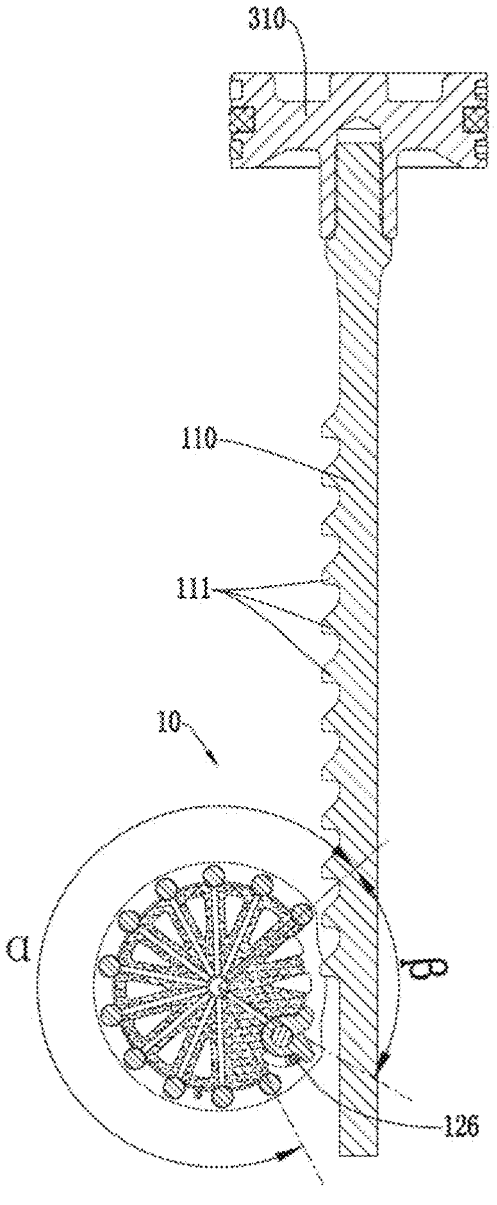
FIG. 20 is a schematic diagram showing the lifting wheel and the firing pin of FIG. 19, in which the firing pin has been released from the lifting wheel and will fall from the uppermost position to fire a nail.

The lifting wheel 120 includes circumferential sectors spanning respectively a first angular range α and a second angular range β. A number of lifting elements 121 are provided in the first angular range α. When the lifting wheel 120 rotates to bring the first angular range α into alignment with the teeth 111, the lifting elements 121 come into engagement with the teeth 111 and thereby lift the firing pin 110 to a high position as shown in FIG. 19. No lifting elements 121 are arranged in the second angular range β. When the lifting wheel 120 rotates to bring the second angular range β into alignment with the teeth 111, as shown in FIG. 20, the lifting elements 121 disengage from the teeth 111, thereby releasing the firing pin 110.

The movable member 130 is movably assembled on the lifting wheel 120 and configured to, as the lifting wheel 120 rotates, move from a first position to a second position to cause an adjustment, which enables accurate engagement of the lifting elements 121 with the teeth 111.

The resilient member acts on the movable member 130 to urge it to return from the second position to the first position.

Specifically, the lifting wheel 120 includes a rotating shaft 127 and a wheel body 128 rotating together with the rotating shaft 127. The wheel body 128 is substantially circular and includes circumferential sectors spanning respectively a first angular range α and a second angular range β. The wheel body 128 includes two spaced walls 122 defining second gap 123 therebetween. The lifting wheel 120 defines arc-shaped through slots 125, and a rod 126 is inserted in the arc-shaped through slots 125. The lifting elements 121 are pins assembled on the lifting wheel 120. Alternatively, the lifting elements 121 may be implemented as teeth. Opposite ends of the pins are assembled to the two spaced walls 122, with their middle portions being received in the second gap 123. Moreover, the pins are movably assembled on the lifting wheel 120. To the end, the lifting wheel 120 defines holes 1212, and the pins are inserted in the holes 1212. End faces of the lifting wheel 120 are covered with cap plates 124, which confine the pins within the holes 1212 in the lifting wheel 120. The lifting wheel 120 has a recessed edge spanning the second angular range β. That is, the recessed edge spanning the second angular range β of the lifting wheel 120 extends within a circular contour defined by its edge spanning the first angular range α. In other words, the edge spanning the second angular range β of the lifting wheel 120 is spaced from its center at a distance smaller than a distance at which the edge spanning the second angular range α of the lifting wheel 120 is spaced from the center.

Specifically, the movable member 130 is swingably assembled by a pin 133 within the second gap 123 between the two spaced walls 122 of the lifting wheel 120 at a location close to a starting point of the first angular range α, which corresponds to a point of the first angular range α, where the lifting elements 121 come into engagement with the teeth 111 and start lifting the firing pin 110, during rotation of the lifting wheel 120. The movable member 130 has a force-receiving portion 131 and an engagement portion 132.

The force-receiving portion 131 and the engagement portion 132 are configured as described below.

In the direction, in which rotation of the lifting wheel 120 causes the firing pin 111 to be lifted, i.e., the counterclockwise direction of FIGS. 19 to 24, the force-receiving portion 131 approaches and leaves the firing pin 110 later, but comes into contact therewith earlier, than the engagement portion 132.

When the movable member 130 is in the first position, the force-receiving portion 131 is in a blocked position, and the engagement portion 132 is away from an engaged position. As the movable member 130 rotates along with the lifting wheel 120, the force-receiving portion 131 is blocked by the teeth 111 and overcome a biasing force of the resilient member, allowing the movable member 130 to move from the first position to the second position. When the movable member 130 is in the second position, the force-receiving portion 131 is away from the blocked position, and the engagement portion 132 is in the engaged position, where it is in the same sequence as the lifting elements 121 for engaging the teeth 111. That is, the engagement portion 132 and the lifting elements 121 can engage the teeth 111 in one-to-one correspondence. The teeth 111 of the firing pin 110 are spaced at a constant tooth pitch S (i.e., adjacent teeth 111 are spaced at equal distances), and adjacent lifting elements are also spaced at a constant pitch δ (equal angular distances). When the engagement portion 132 is in the engaged position, where it is in the same sequence as the lifting elements 121 for engaging the teeth 111, an angular distance θ between the engagement portion 132 and an adjacent lifting element is equal to the pitch δ of the lifting elements.

In FIGS. 25 to 28, the resilient member includes a first torsion spring 141 and a second torsion spring 142, which are separately positioned over the rotating shaft 127 at opposite ends of the lifting wheel 120. The first torsion spring 141 and the second torsion spring 142 are symmetrical. Each of them is hooked at one end in a hole in the lifting wheel 120, and abuts at the other end against one end of the rod 126. Thus, the resilient member can act on the rod 126, causing the rod 126 to exert a biasing force on the movable member 130.

Figure 30:
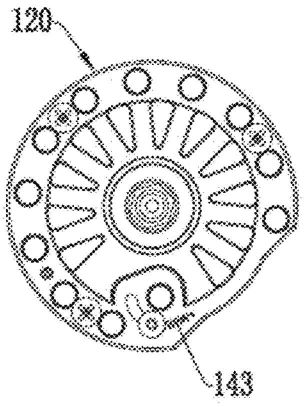
FIG. 30 schematically illustrates a lifting wheel of a third structure according to the present application.

Alternatively, the resilient member may be implemented as a tension spring 143, as shown in FIG. 30, coupled at opposite ends respectively to the lifting wheel 120 and the movable member 130. The resilient member may also be implemented as a compression spring 144, as shown in FIG. 31, supported at opposite ends respectively to the lifting wheel 120 and the movable member 130.

In order to operate a nail gun of such a structure, the motor 210 is first activated to rotate in one direction, and the air pump 50 is driven by the second transmission means 230 to fill air into the sealed chamber 320, creating a gas spring. Filling of air is stopped once the pressure reaches a preset value. In this air-filling process, the first transmission means 220 disengages the motor 210 from driving the lifting wheel 120, and the lifting wheel 120 therefore does not rotate. The motor 210 is then caused to rotate in the other direction, and the first transmission means 220 drives the lifting wheel 120 to rotate in the counterclockwise direction, as shown in FIGS. 19 to 24. Accordingly, the lifting wheel 120 lifts and releases the firing pin 110 to accomplish one nailing action, once per its revolution. During use, the nailing switch 620 may be controlled using a finger to cause the motor 210 to continuously rotate to drive the lifting wheel 120 to consecutively fire nails. Alternatively, the nailing switch 620 may be controlled using a finger to cause the motor 210 to rotate at intervals to drive the lifting wheel 120 to intermittently fire nails.

A process for lifting the firing pin 110 and firing a nail using the firing pin lifting mechanism 10 is described below.

Figure 21:
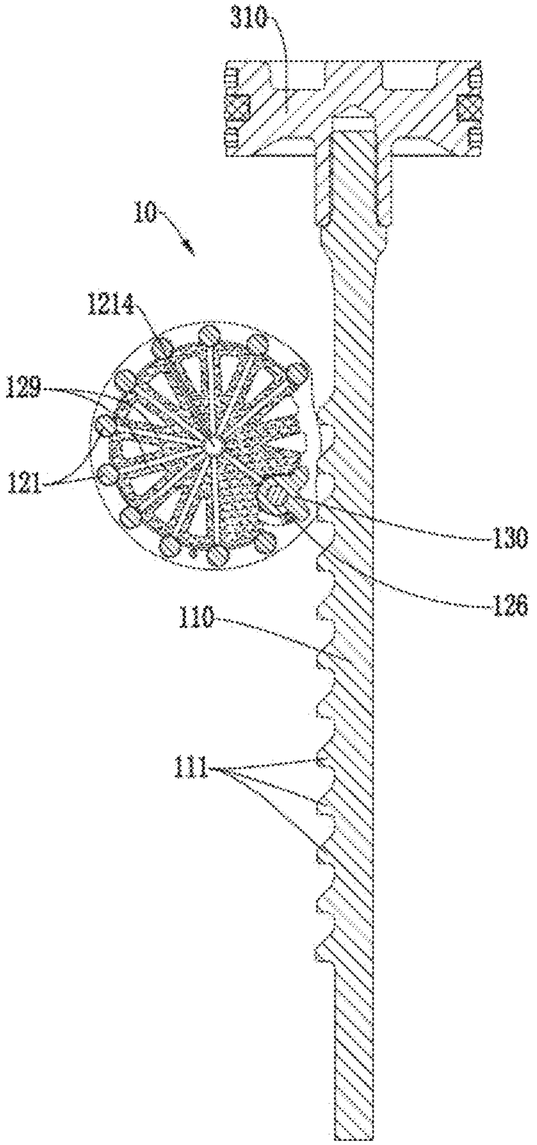
FIG. 21 is a schematic diagram showing the firing pin of FIG. 20, which has fallen to the lowest nailing position.

1. As shown in FIG. 19, the firing pin 110 is usually kept at a high position, allowing the firing pin 110 to immediately fall as soon as the nailing function is activated, without raising the firing pin 110 to the high position before that. This can result in improved nailing efficiency. At the position where the firing pin is kept, the lifting element 121 on the lifting wheel 120 in the first angular range α that is proximal to the second angular range β is in engagement with the lowermost tooth on the firing pin 110.
2. In the configuration shown in FIG. 19, the motor 210 is activated to drive the lifting wheel 120 to rotate in the counterclockwise direction to bring the second angular range β into alignment with the teeth 111, as shown in FIG. 20. Accordingly, the teeth 111 are disengaged from the lifting elements 121, and the firing pin 110 is released. Biased by the gas spring, the first piston 310 moves downward along with the firing pin 110 at an extremely high speed to the lowermost position to fire a nail, as shown in FIG. 21. As the lifting wheel 120 further rotates, the movable member 130 approaches the firing pin 110 until it moves into the first position, in which it is biased by the resilient member, with the force-receiving portion 131 being in the blocked position and the engagement portion 132 away from the engaged position. In the blocked position, the force-receiving portion 131 is blocked by the teeth 111 on the firing pin 110 as the lifting wheel 120 rotates. Since the engagement portion 132 is away from the engaged position, it will not come into engagement with any tooth 111 on the firing pin 110 as the lifting wheel 120 rotates.
3. The lifting wheel 120 further rotates and when it reaches the position shown in FIG. 22, the force-receiving portion 131 is blocked by the teeth 111 and overcomes a biasing force of the resilient member, allowing the movable member 130 to move from the first position shown in FIG. 22 to the second position shown in FIG. 23 by swinging clockwise. In the second position of the movable member 130, as shown in FIG. 23, the force-receiving portion 131 is away from the blocked position and hence from the teeth 111, while the engagement portion 132 is in the engaged position where it is in the same sequence as the lifting elements 121 for engaging the teeth 111. In other words, as shown in FIG. 23, the engagement portion 132 is in engagement with the uppermost tooth 111 on the firing pin 110, and the lifting element 121 adjacent to the engagement portion 132 is just in engagement with the second uppermost tooth 111 on the firing pin 110. All the other lifting elements 121 can engage the respective other teeth 111 on the firing pin 110 in one-to-one correspondence. As the lifting wheel 120 further rotates from the configuration of FIG. 23, the movable member 130 moves away from the firing pin 110 and is returned to its original position by the resilient member. When the lifting wheel 120 reaches the configuration of FIG. 19, the firing pin 110 is raised to the high position. It then further rotates to the configuration of FIG. 20, in which the firing pin 110 is released to fire a nail. Thus, the lifting wheel 120 starts from the configuration of FIG. 19, passes through the configurations of FIGS. 20 to 22 and then returns to the configuration of FIG. 19, completing a nailing cycle. The lifting wheel 120 can be controlled to rotate continuously to consecutively fire nails.

Figure 22:
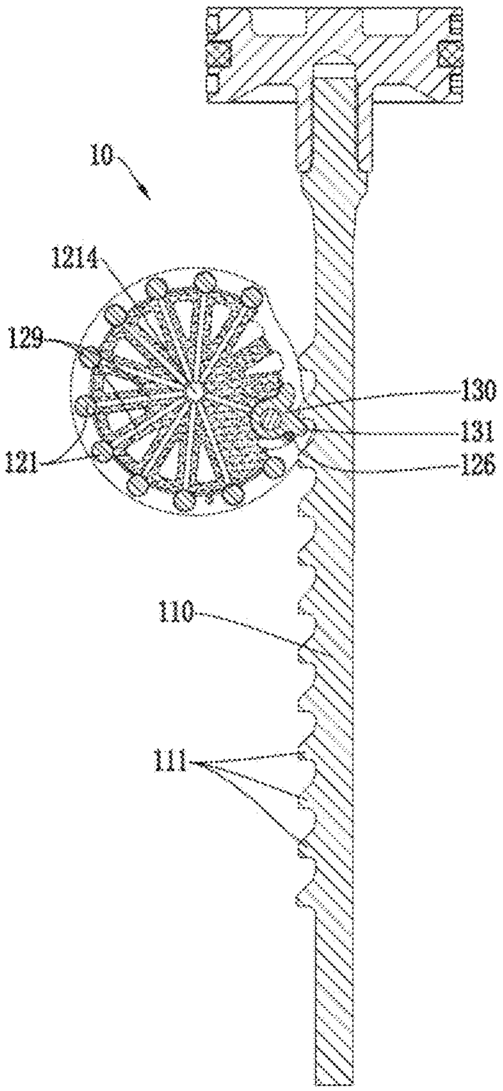
FIG. 22 schematically illustrates movement of a movable member from a first position to a second position caused by a force-receiving portion thereof being blocked by a tooth during continued rotation of the lifting wheel of FIG. 21.
Figure 23:
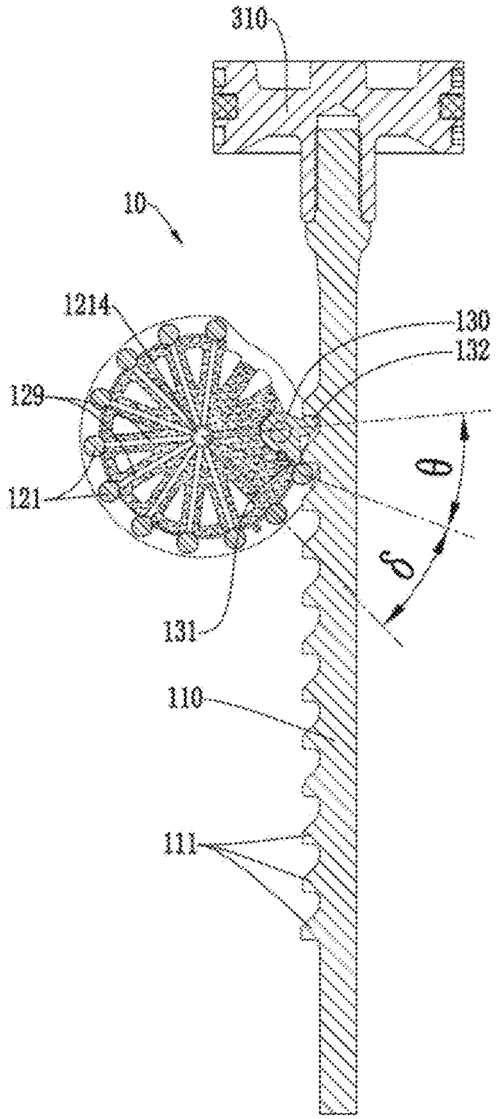
FIG. 23 schematically illustrates the movable member of the FIG. 22, which has moved to the second position where an engagement portion thereof is in an engaged position in which it is in engagement with a tooth on the firing pin.
Figure 24:
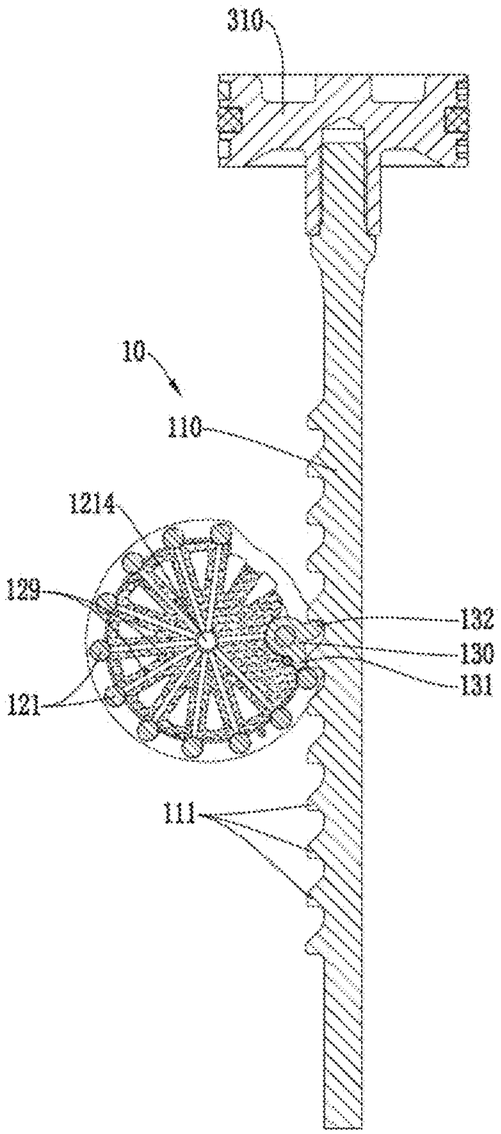
FIG. 24 schematically illustrates the firing pin, which fails to fall to the lowermost position after a nailing cycle and is then adjusted by the movable member into accurate engagement between lifting elements and teeth.
Figure 25:
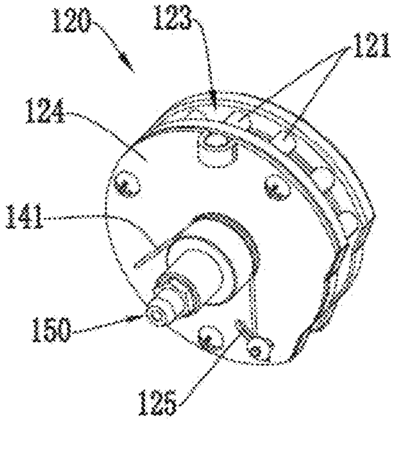
FIG. 25 schematically illustrates a lifting wheel of a structure according to the present application.
Figure 26:
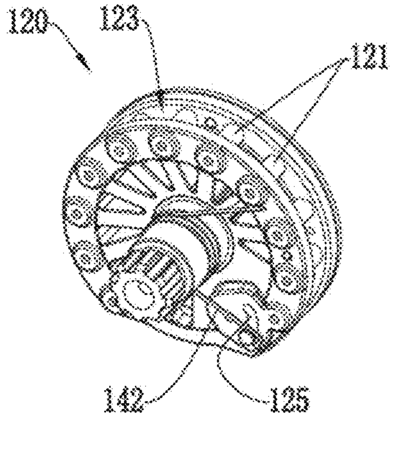
FIG. 26 is a schematic diagram of FIG. 25 from a different perspective angle.
Figure 27:
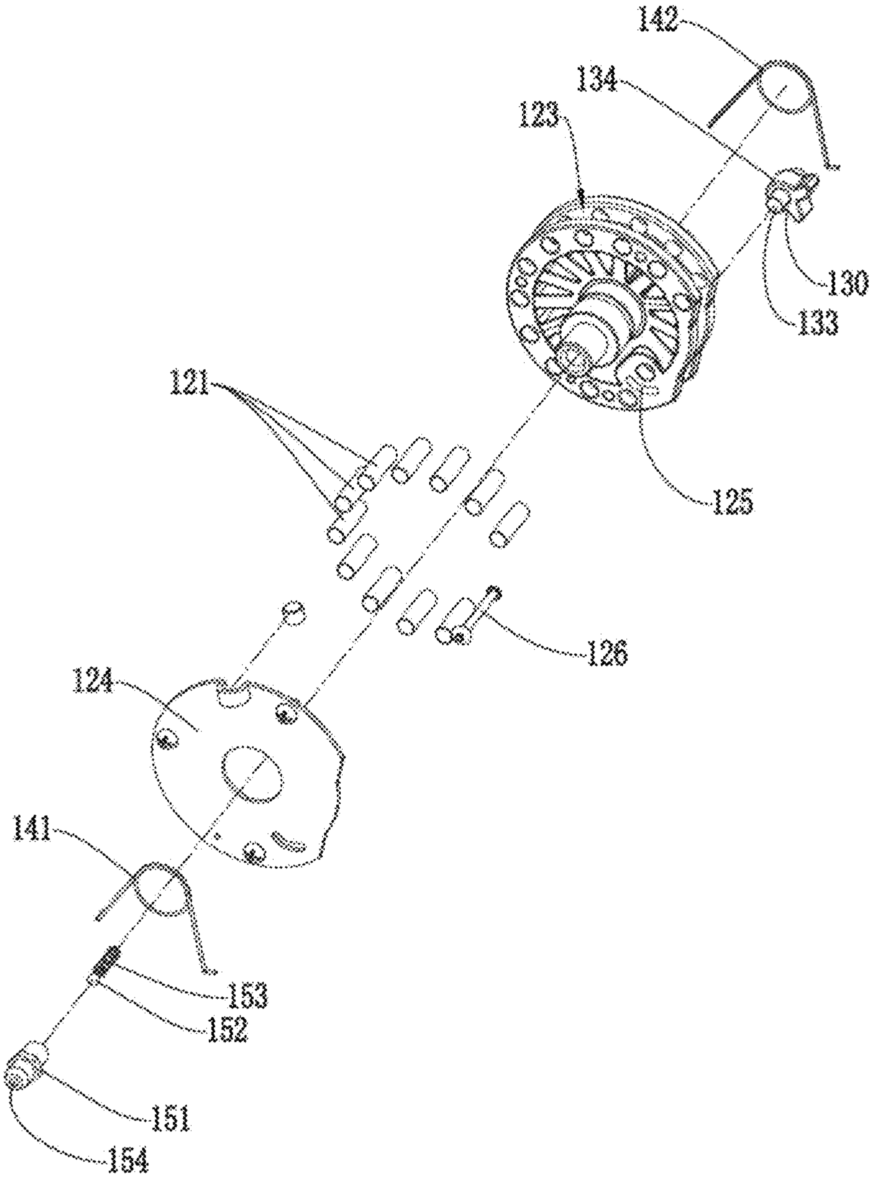
FIG. 27 is a schematic exposed view of the lifting wheel of FIG. 25.
Figure 28:
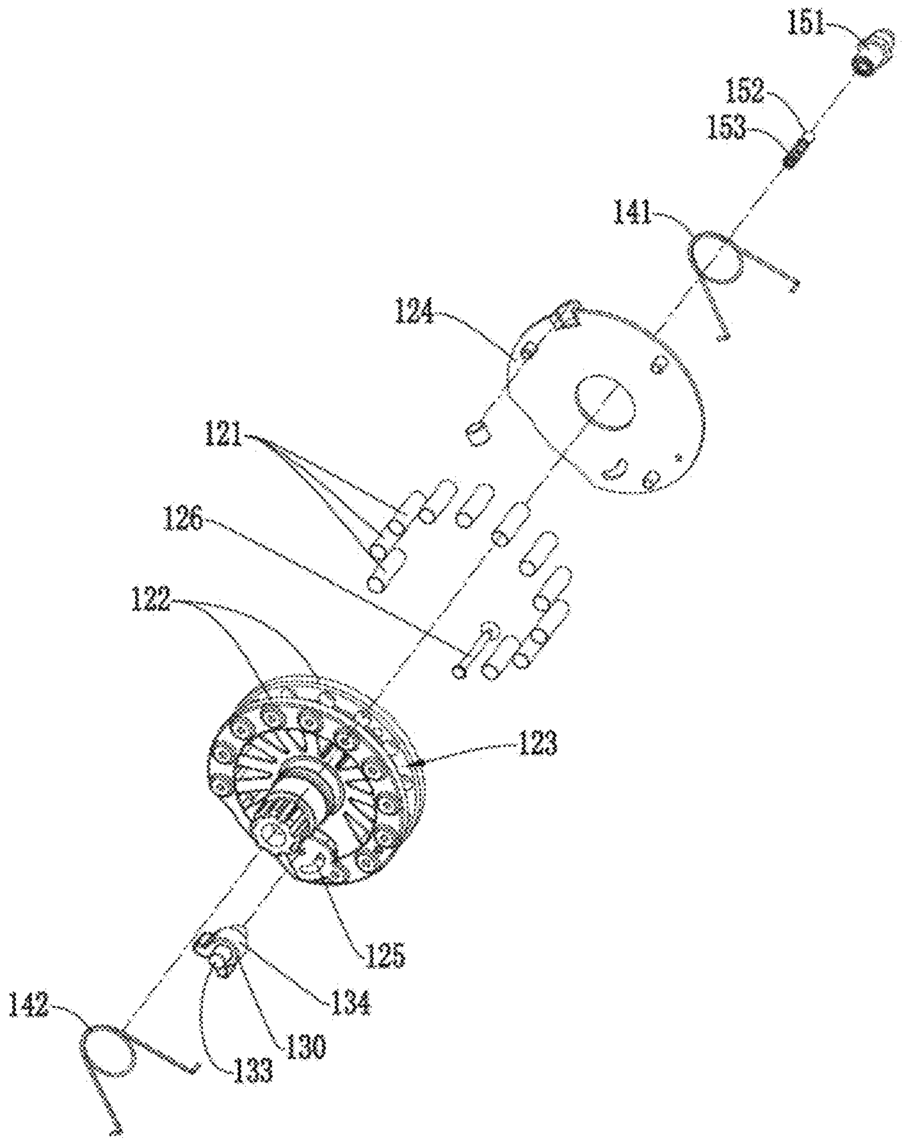
FIG. 28 is a schematic exposed view of the lifting wheel of FIG. 27 from a different perspective angle.
Figure 29:
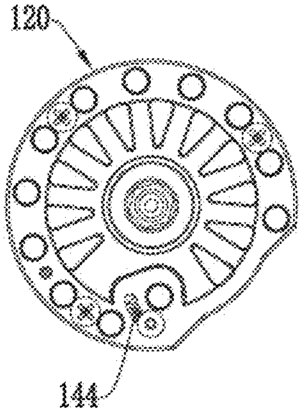
FIG. 29 schematically illustrates a lifting wheel of another structure according to the present application.

During nailing, if the firing pin 110 fails to fall from the configuration of FIG. 20 to the lowermost position shown in FIG. 19, for example, if it stops around the middle of the firing pin 110 along its length, as shown in FIG. 24, as the lifting wheel 120 rotates, the movable member 130 can still swing in the same away as shown in FIGS. 21 to 23, and the engagement portion 132 may come into engagement with, for example, the fifth topmost tooth 111 on the firing pin 110, as shown in FIG. 24. At the same time, the lifting element 121 adjacent to the engagement portion 132 is just in engagement with the sixth topmost tooth 111 on the firing pin 110, and all the other teeth 111 of the firing pin 110 can come into engagement with a subset of the lifting elements 121 in one-to-one correspondence. When the lifting wheel 120 further rotates from the configuration of FIG. 24, the firing pin 110 can be lifted to the high position, but when this happens, the first angular range $\alpha$ has not pivoted away from the alignment with the firing pin 110, and the second angular range $\beta$ has not yet pivoted into alignment with the firing pin 110. Consequently, there are still some lifting elements 121 in the first angular range $\alpha$ waiting for coming into engagement with the teeth 111, and the firing pin 110 will not fall. In this situation, when the lifting wheel 120 further rotates, the waiting lifting elements 121 in the first angular range $\alpha$ will successively come into engagement with the respective lowermost teeth 111 on the firing pin 110, and this will cause slight movement of the firing pin 110 up and down from the high position. After this, all the lifting elements 121 in the first angular range $\alpha$ will pivot away from the teeth 111 on the firing pin 110, and the second angular range $\beta$ will pivot into alignment with the firing pin 110, again allowing the firing pin 110 to fall. During the slight movement of the firing pin 110 from the high position, the waiting lifting elements 121 can exactly engage the respective lowermost teeth 111 on the firing pin 110. Moreover, since the gas spring is compressible, such slight movement of the firing pin 110 from the high position will not cause jamming or damage.

During nailing, the lifting wheel 120 simply rotates without vertically moving at all. Therefore, in FIGS. 19 to 24, vertical movement of the firing pin 110 can be understood by taking the lifting wheel 120 as a positional reference.

As noted above, in each revolution of the lifting wheel 120, all the lifting elements 121 and the movable member 130 thereon successively come into engagement with the teeth 111 on the firing pin 110. Therefore, such engagement occurs at a high frequency, necessitating lubrication. For this reason, the firing pin lifting mechanism 10 is configured with a lubricating arrangement. As shown in FIGS. 45 to 48, this lubricating arrangement includes a grease nipple 150 provided on the lifting wheel 120 and grease channels 129 in the wheel body 128, which extend from the grease nipple 150 to the lifting elements 121.

Specifically, each of the pins that provide the lifting elements 121 is disposed at a port 1211 of a respective one of the grease channels. Axial grooves 1210 are provided in the circumference of the wheel body 128. The ports 1211 of the grease channels are open into, and in communication with, the respective axial grooves 1210, and the pins are provided in the respective axial grooves 1210. The circumference of the wheel body 128 is located at the bottom of the second gap 123, and the opposite ends of the pins are assembled to the two spaced walls 122, with their middle portions being received in the second gap 123. Further, the pins are confined by the cap plates 124 in the holes 1212 on the lifting wheel 120 such as to be movable within the holes 1212.

There are another grease channel 129 in the wheel body 128, which extends from the grease nipple 150 to the movable member 130, and an arc-shaped recess 1213 in the circumference of the wheel body, in which an arc-shaped rotating portion 134 of the movable member 130 is seated. A port 1211 of the grease channel communicates with the arc-shaped recess 1213.

Figure 47:
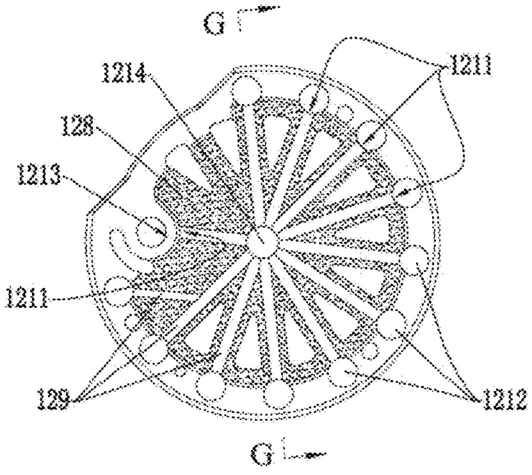
FIG. 47 is a cross-sectional view taken along F-F of FIG. 46.
Figure 48:
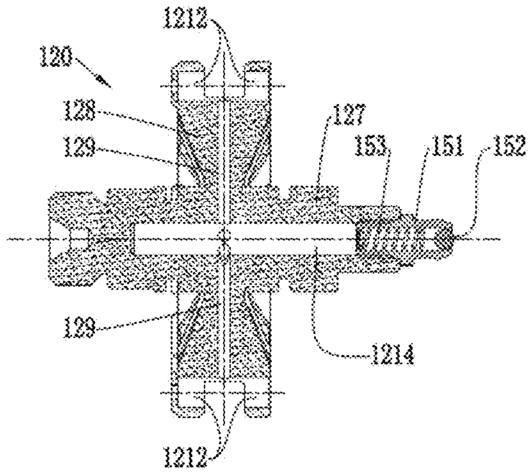
FIG. 48 is a cross-sectional view taken along G-G of FIG. 47.

The grease channels 129 radiate from the center of the wheel body 128, and the rotating shaft 127 defines an axial bore 1214 connected to the grease channels 129. The grease nipple 150 is provided at one end of the rotating shaft 127 and includes a cap 151, a ball 152 and a spring 153. The cap 151 defines a grease inlet port 154, and the ball 152 is supported by the spring 153 to block the grease inlet port 154. Thus, the grease nipple 150 functions like a one-way valve allowing grease only to be filled into the grease channels 129. As shown in FIG. 47, the grease nipple 150 is concealed within the nailer body 700, and a through hole 701 corresponding to the grease nipple 150 is provided in the nailer body 700 and covered by a lid 702. In order to fill lubricating grease, the lid 702 can be removed, and an external device such as a grease gun can be connected to the grease nipple 150 to allow lubricating grease to be filled into the grease channels 129.

It is apparent that the foregoing embodiments of the present invention are merely examples for clearly illustrating the invention, but are not intended to limit the invention to these embodiments. For those of ordinary skill in the art, many variations or modifications to the above embodiments are possible. Enumerating all possible embodiments herein is neither necessary nor possible. Any and all changes, equivalent alternatives and modifications made within the spirit and scope of the present invention are all intended to be embraced within the scope defined by the appended claims.

The invention claimed is:

1. A driving device, wherein the driving device is configured to be able to rotate in a first direction to drive a lifting wheel to lift a firing pin over a first period of time, and to rotate in a second direction to drive an air pump to fill air into a cylinder over a second period of time.

2. The driving device of claim 1, wherein the driving device comprises:

a motor having a first output end and a second output end;

a first transmission means provided between the first output end of the motor and the lifting wheel, the first transmission means comprising a first one-way rotation mechanism, the first transmission means configured so that the first output end, when rotating in the first direction, drives the lifting wheel by means of the first transmission means and that, when the first output end rotates in the second direction, the first one-way rotation mechanism disengages the first output end from driving the lifting wheel; and a second transmission means provided between the second output end of the motor and the air pump, the second transmission means comprising a second one-way rotation mechanism, the second transmission means configured so that the second output end, when rotating in the second direction, drives the air pump by means of the second transmission means and that, when the second output end rotates in the first direction, the second one-way rotation mechanism disengages the second output end from driving the air pump.

3. The driving device of claim 2, wherein the first transmission means further comprises a first speed-reducing mechanism; the lifting wheel, the first speed-reducing mechanism and the first one-way rotation mechanism are coaxially disposed with the first output end; the first speed-reducing mechanism is a planetary gear mechanism with coaxial input and output ends; and the first one-way rotation mechanism is a ratchet-pawl mechanism.

4. The driving device of claim 3, wherein the first one-way rotation mechanism comprises a first ratchet-pawl mechanism configured to: when the first output end rotates in the first direction, be able to come into engagement to drive the lifting wheel; and when the first output end rotates in the second direction, be able to rotate idly to disengage the first output end from driving the lifting wheel.

5. The driving device of claim 4, wherein the first one-way rotation mechanism further comprises a second ratchet-pawl mechanism configured to: when the first output end rotates in the first direction to drive the lifting wheel by means of the first transmission means, be able to rotate idly; and when the lifting wheel rotates in the second direction, be able to come into engagement to block the lifting wheel from rotating in the second direction.

6. The driving device of claim 2, wherein the second transmission means further comprises a second speed-reducing mechanism and a flywheel, the flywheel configured to be able to drive the air pump to fill air into the cylinder, a central axis of the flywheel located below a central axis of the second output end; the second speed-reducing mechanism is an off-axis gear transmission mechanism; and the second one-way rotation mechanism is a ratchet-pawl mechanism.

7. The driving device of claim 6, wherein the second transmission means comprises the off-axis gear transmission mechanism and a third ratchet-pawl mechanism, which successively transmit power from the second output end to the flywheel, the third ratchet-pawl mechanism configured so that the second output end, when rotating in the second direction, drives the flywheel by means of the second transmission means; and that, when the second output end rotates in the first direction, the third ratchet-pawl mechanism disengages the second output end from driving the flywheel.

* * * * *